US012594676B1

(12) United States Patent　　　　(10) Patent No.:　US 12,594,676 B1

O'Brien et al.　　　　　　　　　　　(45) Date of Patent:　　　Apr. 7, 2026

(54) AUTOMATED SYSTEMS AND METHODS FOR INSTALLING FASTENERS THROUGH CONSTRUCTION CONNECTORS

(71) Applicant: ENGtegrity, Inc, Lake Forest, CA (US)

(72) Inventors: Michael O'Brien, Lake Forest, CA (US); Robert T. Winslow, Park City, UT (US)

(*) Notice: Subject to any disclaimer, the term of this patent is extended or adjusted under 35 U.S.C. 154(b) by 0 days.

(21) Appl. No.: 19/228,151

(22) Filed: Jun. 4, 2025

(51) Int. Cl.
| | |
|---|---|
| *B25J 9/16* | (2006.01) |
| *B25J 5/00* | (2006.01) |
| *B25J 19/02* | (2006.01) |
| *G05D 1/689* | (2024.01) |

(52) U.S. Cl.
CPC ............. *B25J 9/1697* (2013.01); *B25J 5/007* (2013.01); *B25J 9/161* (2013.01); *B25J 19/023* (2013.01); *G05D 1/689* (2024.01)

(58) Field of Classification Search
CPC ........ B25J 9/162; B25J 9/1679; B25J 9/1687; B25J 9/1694; B25J 9/1697; B25J 9/161; B25J 9/1664; B25J 11/005; B25J 11/007; B25J 13/085; B25J 19/021; B25J 19/023; B25J 5/00–04; G05D 1/0094; G05D 1/689; G05D 1/6895; E04B 1/2608; E04B 1/2612; E04B 1/2644
See application file for complete search history.

(56) References Cited

U.S. PATENT DOCUMENTS

| | | | |
|---|---|---|---|
| 4,831,232 | A | 5/1989 | Andersson et al. |
| 5,381,597 | A | 1/1995 | Petrove |
| 9,744,615 | B2 | 8/2017 | Jones et al. |

| | | | |
|---|---|---|---|
| 9,945,128 | B1 | 4/2018 | Baird |
| 9,995,047 | B2 | 6/2018 | Raman et al. |
| 10,358,196 | B2 | 7/2019 | Tang |
| 11,673,272 | B2 | 6/2023 | Loosararian et al. |
| 11,739,542 | B2 | 8/2023 | Furrer et al. |
| 11,795,680 | B2 | 10/2023 | Meagher et al. |
| 12,233,569 | B1 | 2/2025 | Scepaniak et al. |

(Continued)

FOREIGN PATENT DOCUMENTS

| | | |
|---|---|---|
| CA | 2359221 A1 | 4/2002 |
| WO | 2024104716 A1 | 5/2024 |

(Continued)

*Primary Examiner* — Spencer D Patton

(74) *Attorney, Agent, or Firm* — Total Awareness Consulting Services; Robert Winslow

(57)　　　　　　ABSTRACT

An Unmanned Ground Vehicle (UGV) may include a guidance system, a propulsion system, an imaging system, at least one memory storing instructions, and at least one processor being configured to execute the instructions to perform operations. The operations may include automatically navigating the UGV to an imaging location through employment of the guidance system, the propulsion system, and the imaging system. The operations may include automatically capturing image data. The image data may indicate a construction connector. The operations may include automatically classifying the image data through employment of a classifier. The classifier may be based on construction connector training data. The construction connector training data may relate to a plurality of construction connectors. The operations may include automatically determining an installation state of the construction connector based on the classification.

20 Claims, 21 Drawing Sheets

(56) References Cited

U.S. PATENT DOCUMENTS

| | | | |
|---|---|---|---|
| 12,291,875 B1 * | 5/2025 | Scepaniak | E04D 15/04 |
| 2004/0115022 A1 * | 6/2004 | Albertson | B27F 7/00 411/13 |
| 2010/0243699 A1 * | 9/2010 | Largo | B25C 1/08 227/10 |
| 2012/0180424 A1 | 7/2012 | Hinshaw et al. | |
| 2016/0371400 A1 | 12/2016 | Challita et al. | |
| 2020/0148348 A1 | 5/2020 | Bradley et al. | |
| 2023/0229986 A1 | 7/2023 | Cami et al. | |
| 2023/0254559 A1 | 8/2023 | Michiwaki | |
| 2023/0390946 A1 | 12/2023 | Bley et al. | |
| 2024/0001477 A1 | 1/2024 | Griffin et al. | |
| 2024/0017408 A1 * | 1/2024 | Attar | B25J 9/1687 |
| 2024/0119624 A1 | 4/2024 | Eberspach et al. | |
| 2024/0134007 A1 * | 4/2024 | Feng | G01S 7/412 |
| 2024/0229464 A9 | 7/2024 | Francis et al. | |
| 2024/0375288 A1 | 11/2024 | Ames et al. | |
| 2024/0408765 A1 * | 12/2024 | Oridate | B25J 9/1664 |
| 2024/0417977 A1 | 12/2024 | Brown et al. | |
| 2025/0059769 A1 | 2/2025 | Stulc et al. | |
| 2025/0104190 A1 * | 3/2025 | Stryzheus | G01B 5/0004 |

FOREIGN PATENT DOCUMENTS

| | | | |
|---|---|---|---|
| WO | 2024124968 A1 | 6/2024 | |
| WO | 2024138219 A2 | 6/2024 | |
| WO | 2025047075 A1 | 3/2025 | |

* cited by examiner

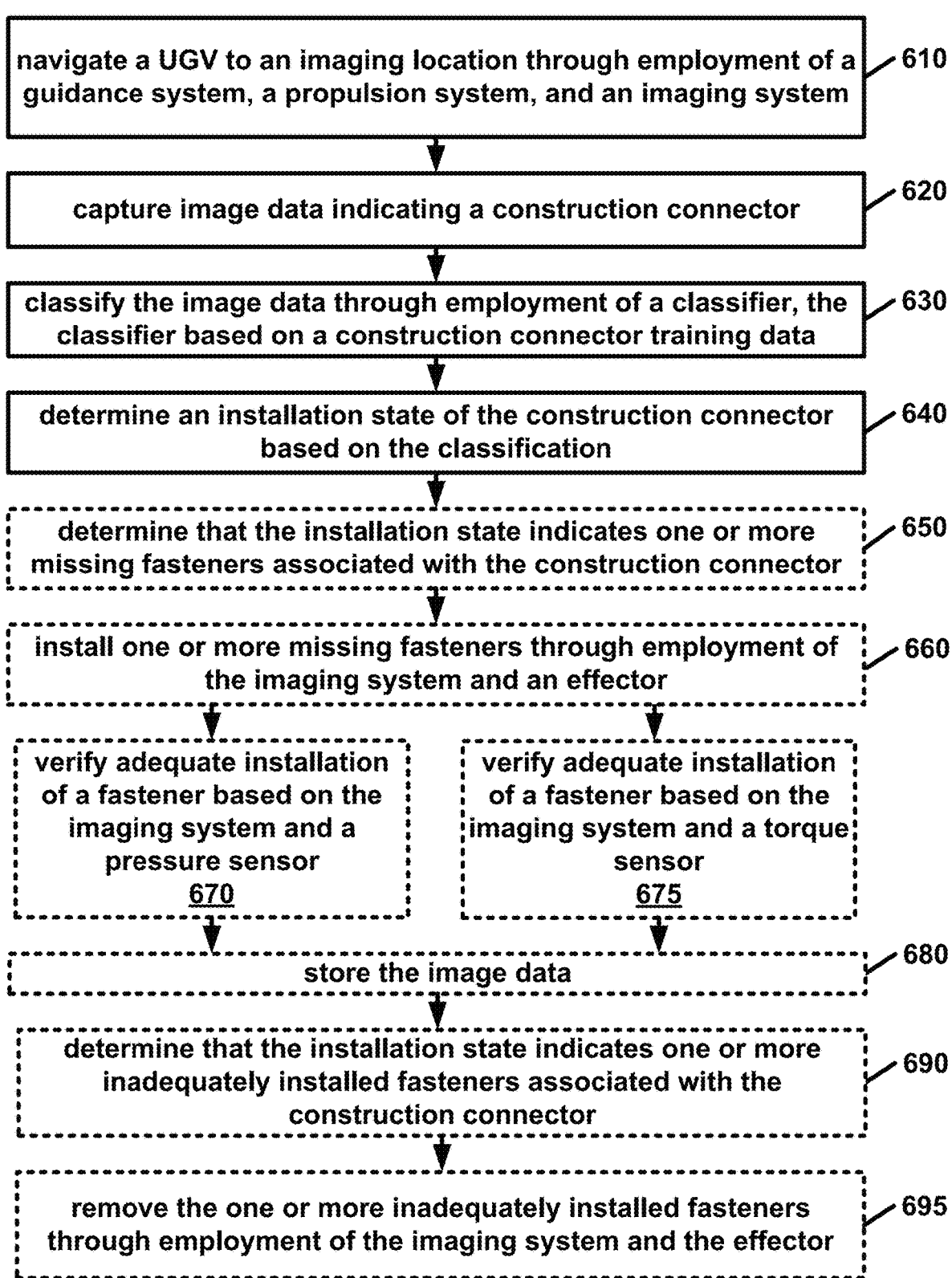

navigate a UGV to an imaging location through employment of a guidance system, a propulsion system, and an imaging system — 610 capture image data indicating a construction connector — 620 classify the image data through employment of a classifier, the classifier based on a construction connector training data — 630 determine an installation state of the construction connector based on the classification — 640 determine that the installation state indicates one or more missing fasteners associated with the construction connector — 650 install one or more missing fasteners through employment of the imaging system and an effector — 660 verify adequate installation of a fastener based on the imaging system and a pressure sensor 670 verify adequate installation of a fastener based on the imaging system and a torque sensor 675 store the image data — 680 determine that the installation state indicates one or more inadequately installed fasteners associated with the construction connector — 690 remove the one or more inadequately installed fasteners through employment of the imaging system and the effector — 695

FIG. 6

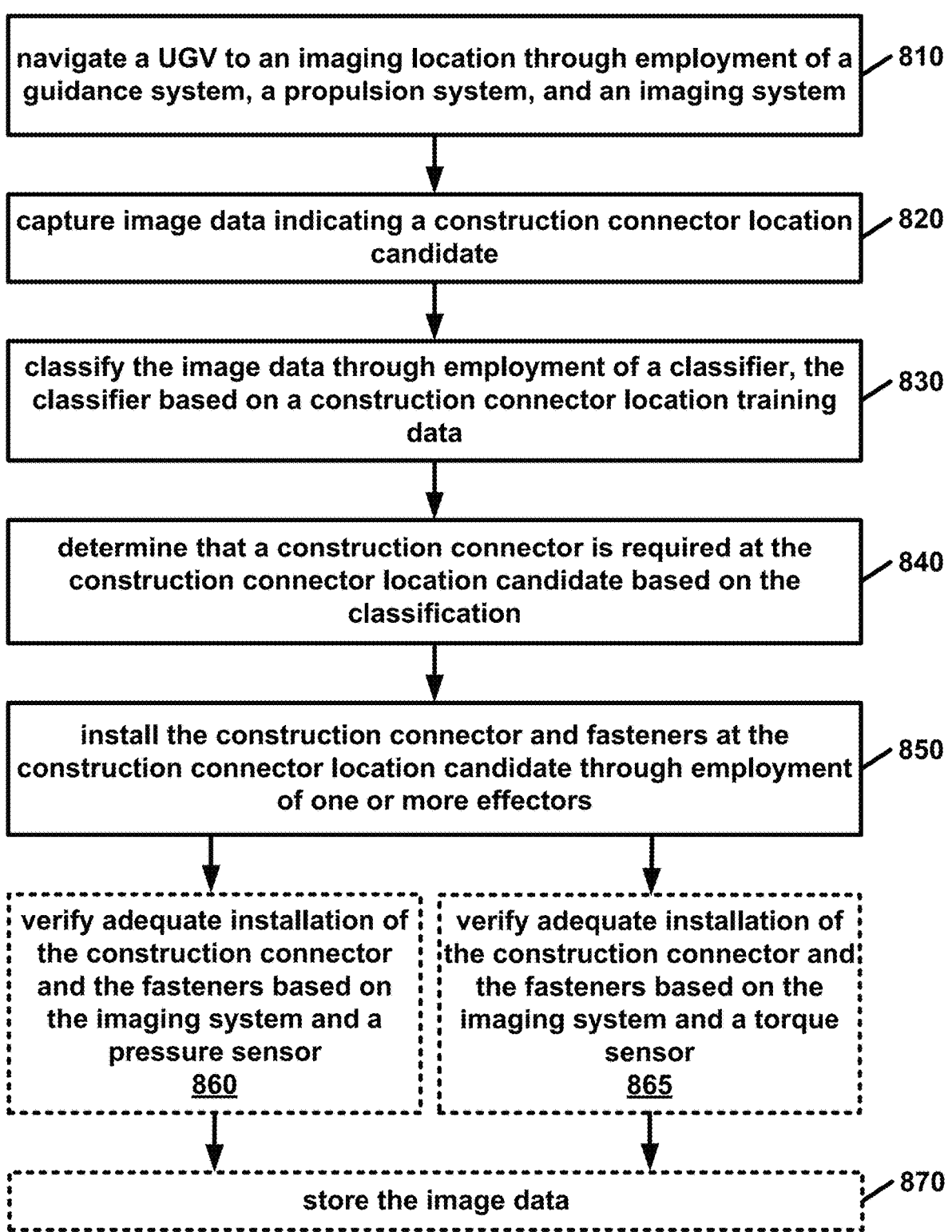

navigate a UGV to an imaging location through employment of a guidance system, a propulsion system, and an imaging system ⟋810 capture image data indicating a construction connector location candidate ⟋820 classify the image data through employment of a classifier, the classifier based on a construction connector location training data ⟋830 determine that a construction connector is required at the construction connector location candidate based on the classification ⟋840 install the construction connector and fasteners at the construction connector location candidate through employment of one or more effectors ⟋850 verify adequate installation of the construction connector and the fasteners based on the imaging system and a pressure sensor 860 verify adequate installation of the construction connector and the fasteners based on the imaging system and a torque sensor 865 store the image data ⟋870

FIG. 8

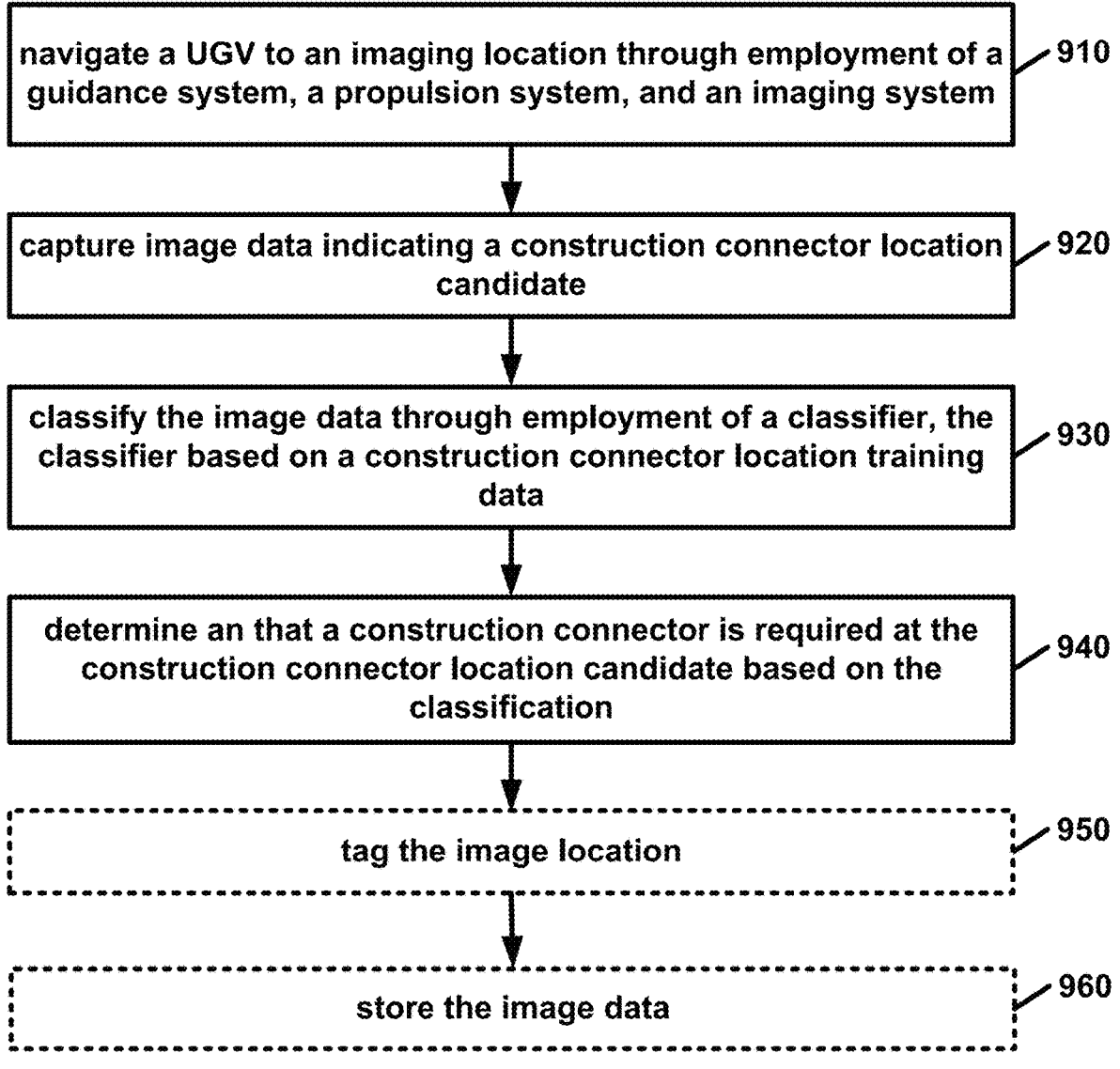

navigate a UGV to an imaging location through employment of a guidance system, a propulsion system, and an imaging system                910 capture image data indicating a construction connector location candidate                920 classify the image data through employment of a classifier, the classifier based on a construction connector location training data                930 determine an that a construction connector is required at the construction connector location candidate based on the classification                940 tag the image location                950 store the image data                960

FIG. 9

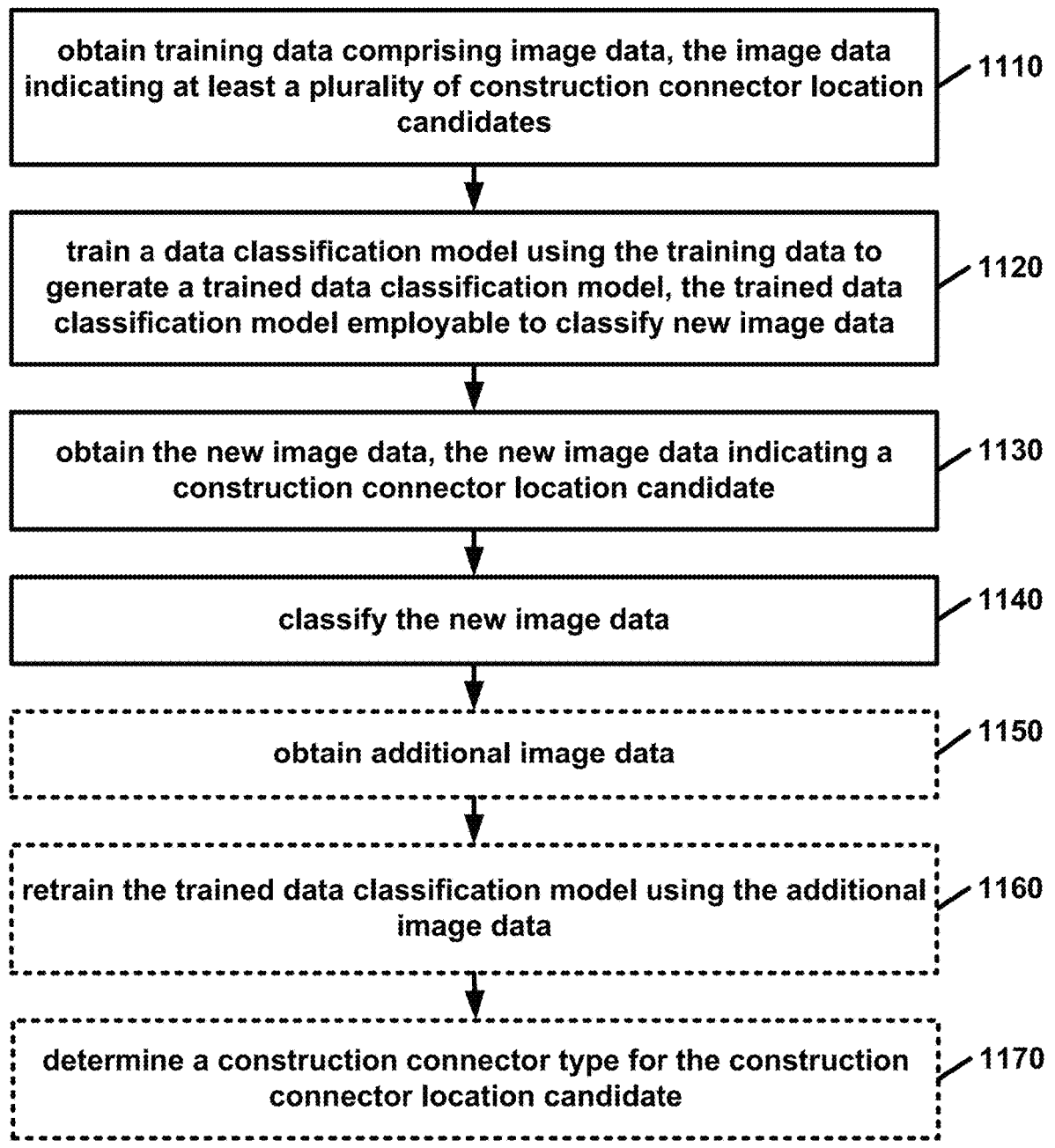

obtain training data comprising image data, the image data indicating at least a plurality of construction connector location candidates — 1110 train a data classification model using the training data to generate a trained data classification model, the trained data classification model employable to classify new image data — 1120 obtain the new image data, the new image data indicating a construction connector location candidate — 1130 classify the new image data — 1140 obtain additional image data — 1150 retrain the trained data classification model using the additional image data — 1160 determine a construction connector type for the construction connector location candidate — 1170

AUTOMATED SYSTEMS AND METHODS FOR INSTALLING FASTENERS THROUGH CONSTRUCTION CONNECTORS

BACKGROUND

Conventional approaches to construction connector installation require skilled workers. Installation of many construction connectors are required in locations that expose skilled workers to danger. Many construction connectors are installed incorrectly. For example, some construction connectors require installation of one or more fasteners at a predetermined angle to a reference plane. Installation of many construction connectors are incomplete. For example, many construction connectors require a minimum number of fasteners to be installed. For example, many fasteners are installed incorrectly and do not adequately connect a first substrate to a second substrate. For example, many fasteners are installed incorrectly and do not achieve the minimum required depth into a first substrate or a second substrate.

Problems may arise in conventional approaches to construction connector installation when improperly installed construction connectors aren't recognized by the installer. Problems may arise in conventional approaches when improperly installed construction connectors aren't rectified by the installer. Problems may arise in conventional approaches when improperly installed construction connectors aren't recognized by an inspector.

Accordingly, given the shortcomings of conventional approaches, a need exists for unconventional approaches and devices that provide safe, efficient, and effective installation of construction connectors and associated fasteners.

This Background is provided to introduce a brief context for the Detailed Description that follows. This Background is not intended to be an aid in determining the scope of the claimed subject matter nor be viewed as limiting the claimed subject matter to implementations that solve any or all of the shortcomings or problems presented above.

BRIEF DESCRIPTION OF THE SEVERAL VIEWS OF THE DRAWINGS

The accompanying drawings, which are incorporated in and constitute a part of this specification, illustrate several embodiments and, together with the description, serve to explain the disclosed principles. In the drawings:

FIG. 6 is a flow diagram of an example process for determining an installation state of a construction connector, consistent with disclosed embodiments.

FIG. 8 is a flow diagram of an example process for determining that a construction connector is required at a construction connector location candidate, consistent with disclosed embodiments.

FIG. 9 is a flow diagram of an example process for determining that a construction connector is required at a construction connector location candidate and tagging an imaging location, consistent with disclosed embodiments.

FIG. 11 is a flow diagram of an example process for classifying image data associated with construction connector location candidates, consistent with disclosed embodiments.

DETAILED DESCRIPTION OF EMBODIMENTS

Figure 1:
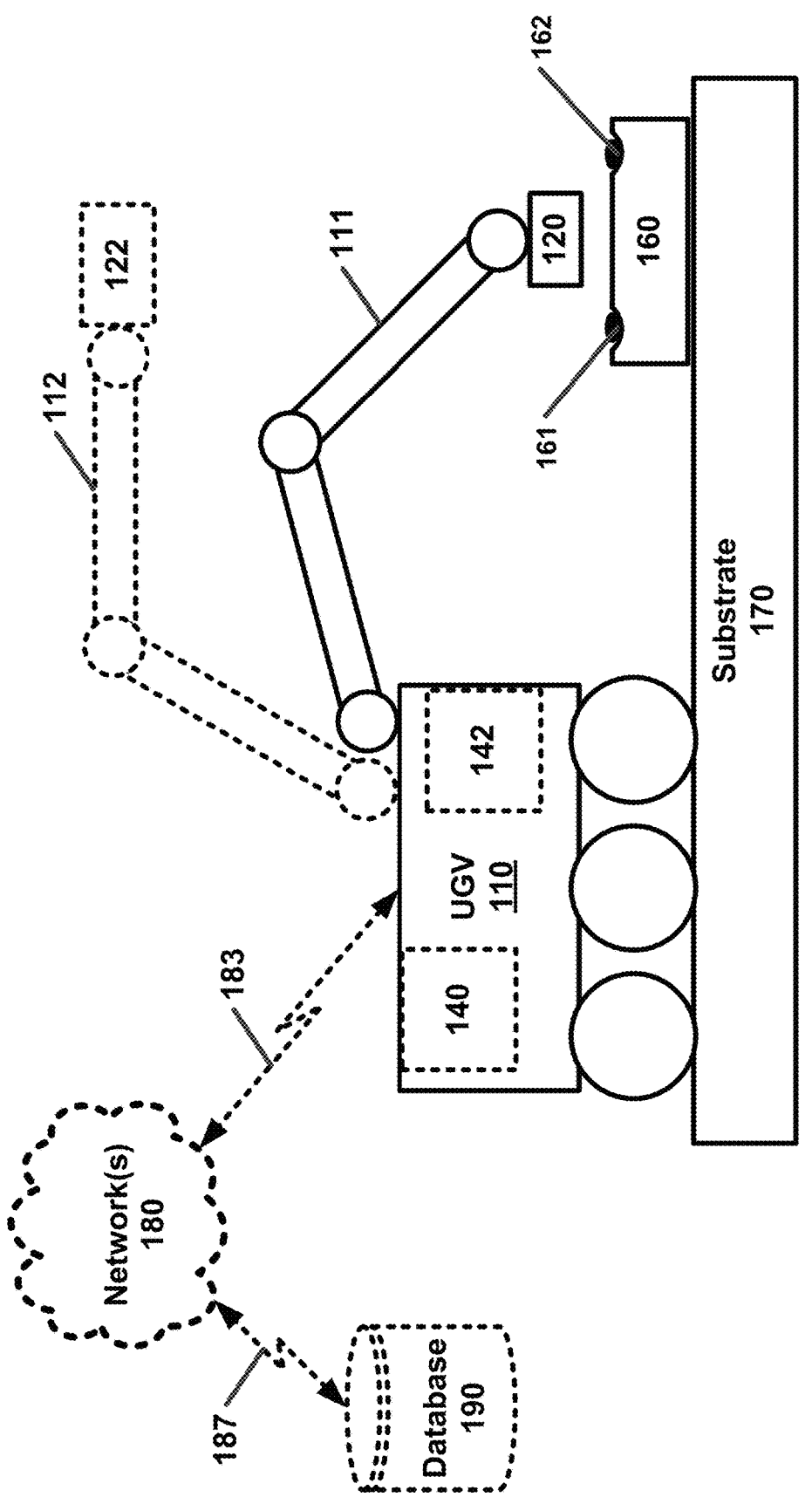
FIG. 1 is a block diagram of an example Unmanned Ground Vehicle (UGV) configured to determine an installation state of an example construction connector, consistent with disclosed embodiments.

Disclosed embodiments provide unconventional systems and methods for various automated construction activities through employment of unconventional artificial intelligence techniques.

Embodiments consistent with the present disclosure are rooted in computer, robotic, data capturing, and data processing technologies and may include capturing and processing various types of data including image data. Capturing and processing image data according to disclosed embodiments may improve efficiency over conventional approaches that require manual detection, manual installation, manual verification, and/or manual inspection. Furthermore, since skilled workers are limited to hours worked per day and/or week, and require breaks throughout a work day, employment of disclosed embodiments may decrease construction timelines. Capturing and processing image data according to disclosed embodiments may improve worker safety by reducing or eliminating the need for skilled workers to be exposed to dangerous locations. Capturing and processing image data according to disclosed embodiments may improve effectiveness over conventional approaches where installation of construction components (e.g., construction connectors, fasteners, and/or decking) are inadequate. Since complete verification of fastener installation may require inspection below the surface of a substrate, capturing and processing image data according to disclosed embodiments may provide a more complete verification of fastener installation.

Some embodiments comprising one or more Unmanned Ground Vehicles (UGVs) may be configured for quiet operation. Operating the unconventional UGVs may improve efficiency over conventional approaches that are limited to certain hours of the day and/or certain days of the week.

Embodiments consistent with the present disclosure are rooted in artificial intelligence technologies and may include classifying various types of image data. Capturing, processing, and classifying disclosed image data at the high speed and accuracy desired on construction sites may require unconventional feature recognition, unconventional machine learning, and/or unconventional data classification techniques.

As used herein, a substrate may refer to any material employed in construction. The material may be structural. The material may be part of a foundation. The material may be part of a component of a building, structure, or construction site.

As used herein, a construction connector is a component that may be configured to join different substrates and/or types of substrates together.

As used herein, a construction connector location candidate is a location where installation of a construction connector may be desired. A construction connector may be desired to satisfy one or more construction requirements.

As used herein, an Unmanned Ground Vehicle (UGV) may comprise an unmanned vehicle with a guidance system. A UGV may comprise a terrestrial drone with a guidance system. A UGV may comprise a plurality of wheels and/or tracks. A UGV may comprise one or more robotic legs. A UGV may comprise at least one foot. A foot may comprise one or magnets. A foot may comprise one or more suction devices. A UGV may be configured for remote control. A UGV may comprise one or more guidance systems. A guidance system may comprise at least one of the following: a Global Positioning System (GPS) receiver, a Global Navigation Satellite System (GLONASS) receiver, a BeiDou Navigation Satellite System (BDS) receiver, a Galileo receiver, and/or any other type of global navigation satellite system (GNSS) or regional navigation satellite system (RNSS) receiver. A UGV may be configured to communicate with a Real-Time Kinematic (RTK) positioning network. A UGV may be configured to communicate with a SmartNet. A guidance system may comprise a vision guidance system. A vision guidance system may employ one or more image sensors. A guidance system may be configured to navigate a UGV autonomously or semi-autonomously. For example, a guidance system may be configured to navigate a UGV along a predetermined path. The predetermined path may comprise a plurality of coordinates. The coordinates may comprise a plurality of GPS coordinates or any other coordinates that represent a three-dimensional location. The coordinates may comprise any combination of: distances, bearings, and/or angles from a known three-dimensional location that may be employed to calculate a plurality of additional three-dimensional locations.

In some embodiments, a UGV may be powered through employment of any combination of: one or more batteries, one or more generators, and/or one or more shore power cables. A UGV may comprise one or more solar panels configured to charge one or more batteries. A UGV may comprise an air compressor configured to drive one or more pneumatic effectors. A UGV may be configured for quiet operation. A UGV may be configured for quiet operation during predetermined hours of the day and/or days of the week. For example, a UGV may be configured to run a generator and/or an air compressor during daylight hours. The UGV may be configured to employ one or more noise generating effectors during daylight hours. The UGV may be configured to employ one or more quiet effectors during evening hours.

Embodiments consistent with the present disclosure may include a substrate. A substrate may comprise, but is not limited to, at least one of the following: dimensional lumber, engineered wood, composite wood, laminated wood, sheathing, sheet metal, metal deck, structural steel, concrete, masonry, drywall, foam, Insulated Metal Panels (IMP), Fiber Reinforced Polymer (FRP) composite, roofing material, or any other material that may be employed in construction. Examples of engineered wood may include, but are not limited to, Parallel Strand Lumber (PSL), Structural Composite Lumber (SCL), Laminated Veneer Lumber (LVL), Laminated Strand Lumber (LSL), Oriented Strand Lumber (OSL), mass timber, Cross-Laminated Timber (CLT), or any other type of engineered material comprising wood. Composite wood may comprise wood fibers and one or more inorganic materials such as, for example, plastic. Alternatively, composite wood may be configured to resemble wood and may not contain any wood fibers. Examples of composite wood may include, but are not limited to, composite decking, composite railing, composite fencing, composite siding, composite fascia, or any other construction component or covering comprising composite material. Examples of laminated wood may include, but are not limited to, plywood, Oriented Strand Board (OSB), laminated wood flooring, fiberboard, particleboard, or any other laminated wood material. Examples of concrete may include concrete-like materials such as stucco, slurry, gypsum concrete, stucco, geopolymers, or any other concrete-like material. Foam may be part of foam board insulation, Structural Insulated Panels (SIP), or any other construction material comprising foam.

Embodiments consistent with the present disclosure may include fasteners. Fasteners may be employed to connect a construction connector to one or more substrates. Fasteners may be employed to connect metal deck to one or more substrates. Examples of fasteners may include, but are not limited to, nails, screws, bolts, lag bolts, self-tapping screws, sheet metal screws, pins, rivets, concrete anchors, or any other type of fasteners that may be employed to connect a construction connector and/or decking to one or more substrates.

Embodiments consistent with the present disclosure may include an Unmanned Ground Vehicle (UGV). The UGV may comprise one or more guidance systems. The UGV may comprise one or more propulsion systems. A propulsion system may be configured to propel the UGV over ground, a structure, a substrate, or any other component or aspect of a building, structure, or construction site. A propulsion system may be configured to propel the UGV horizontally, vertically, or any combination of horizontal and vertical.

In some embodiments, a UGV may comprise an imaging system. The imaging system may comprise one or more image sensors. Examples of image sensors include, but are not limited to, Charge-Coupled Device (CCD) and/or Complementary Metal-Oxide Semiconductor (CMOS). The imaging system may comprise one or more photoelectric sensors. The imaging system may comprise one or more lenses, one or more interchangeable lenses, one or more filters, one or more color filter arrays, and/or one or more piezoelectric cell actuators. The imaging system may be configured to capture image data. The image data may be employed to create three-dimensional profiles of captured construction connectors, fasteners, substrates, and/or structures.

Embodiments consistent with the present disclosure may include a construction connector. A construction connector may comprise metal plating. A construction connector may comprise plastic and/or other durable materials. A construction connector may comprise one or more designators. A construction connector may comprise a multiplane construction connector. A multiplane construction connector may exist in a plurality of planes. A multiplane construction connector may require fastener installation in two or more directions for proper installation of the construction connector. A construction connector may comprise a plurality of fastener receptacles. A fastener receptacle may comprise a hole drilled or otherwise formed in a construction connector. A fastener receptacle may be configured to receive a fastener for fastener installation through the construction connector to a substrate behind the construction connector. A substrate behind the construction connector may be the same as a substrate under the construction connector, or a substrate above the construction connector. A construction connector may comprise one or more adjustable components. Examples of construction connectors include but are not limited to structural connectors, wood connectors, timber connectors, framing connectors, wall connectors, board connectors, decorative connectors, bridging connectors, bracing connectors, deflection connectors, drift connectors, steel connectors, lateral connectors, rigid connectors, truss connectors, hinged connectors, holdowns, strap ties, and tension ties. A construction connector may be configured for employment on structures comprising wood, metal, concrete, and/or masonry. Manufacturers of construction connectors include but are not limited to Simpson Strong-Tie®, MiTek®, and KNAPP®.

Embodiments consistent with the present disclosure may include image data. Image data may be based on preprocessed images. Preprocessing images may include resizing, normalizing, filtering, and/or performing data augmentation. Preprocessing images may include image transformation, image enhancement, noise reduction, and/or morphological techniques. Preprocessing images may include edge detection, corner detection, blob detection, and/or texture analysis. Preprocessing images may include shape-based feature extraction, transform-based feature extraction, and/or local feature detection. Preprocessing images may comprise calculating a Histogram of Oriented Gradients (HOG) feature descriptor. Preprocessing images may comprise performing a Features from Accelerated Segment Test (FAST). Preprocessing images may comprise performing a Scale-Invariant Feature Transform (SIFT). Preprocessing images may comprise determining Speeded-Up Robust Features (SURF). Image data may indicate at least one construction connector. Image data may indicate at least one construction connector that is uninstalled. Image data may indicate at least one construction connector that has been installed according to specification. Image data may indicate at least one construction connector that has been partially installed. Image data may indicate at least one construction connector that has been installed incorrectly. Image data may indicate at least one construction connector location candidate.

Embodiments consistent with the present disclosure may include labeled samples of image data. Labels associated with labeled samples may indicate at least one of more of the following: a construction connector type, an improper installation of a construction connector, one or more missing fasteners associated with a construction connector, one or more inadequately installed fasteners associated with a construction connector, a construction connector that is uninstalled, a construction connector that has been installed according to specification, a construction connector that has been partially installed, and/or a construction connector that has been installed incorrectly. One or more inadequately installed fasteners associated with a construction connector may indicate at least one of the following: an inadequate fastener size, an inadequate fastener type, and/or inadequate penetration of one or more fasteners into a substrate. Labels associated with labeled samples may indicate at least one of more of the following: a construction connector location candidate, a construction connector location candidate for a specific construction connector type, a deck joint, a side seam, a transition, at least one edge of at least one substrate material, and/or at least one portion of at least one substrate material. Metadata may comprise the labels associated with labeled samples.

Some embodiments may include one or more machine learning algorithms. One or more of the machine learning algorithms may be configured for supervised learning. One or more of the machine learning algorithms may be configured for unsupervised learning. One or more of the machine learning algorithms may be configured for semisupervised learning. The one or more machine learning algorithms may be based on one or more artificial neural networks, linear regressions, logistic regressions, K-Means Clustering, Support Vector Machines (SVM), and/or k-Nearest Neighbors (k-NN). One or more of the machine learning algorithms may be specifically programmed to organize one or more aspects of image data. The one or more aspects may be specific to images of construction connectors, construction connector types, fasteners, fastener types, inadequately installed fasteners, missing fasteners, adequately installed fasteners, substrates, installation states, construction connector location candidates, and/or construction connector location candidate types. One or more of the machine learning algorithms may be trained on image data to create a machine learning model. In supervised learning, one or more of the machine learning algorithms may be trained on labeled samples of image data. In unsupervised learning, one or more of the machine learning algorithms may be trained on unlabeled samples of image data. In semisupervised learning, one or more of the machine learning algorithms may be trained on both labeled samples of image data and unlabeled samples of image data. One or more of the machine learning algorithms may be trained on image data to create a data classification model.

Some embodiments may include one or more machine learning models. One or more of the machine learning models may be employed by a classifier. One or more of the machine learning models may be employed to automatically classify image data. A machine learning model may comprise the output of one or more machine learning algorithms executed on training data. Training data may comprise image data. One or more of the machine learning models may be specifically programmed to classify image data based on one or more aspects of the image data. The one or more aspects may be specific to images of construction connectors, construction connector types, fasteners, fastener types, inadequately installed fasteners, missing fasteners, adequately installed fasteners, substrates, installation states, construction connector location candidates, and/or construction connector location candidate types.

Some embodiments may include one or more deep learning models. One or more of the deep learning models may be employed by a classifier. One or more of the deep learning models may be specifically programmed to automatically identify features of image data. The one or more deep learning models may be based on a Convolutional Neural Network (CNN). The CNN may comprise a multilayer CNN. A multilayer CNN may comprise three or more layers. The one or more deep learning models may be based on an autoencoder. An autoencoder may be based on unsupervised training data to automatically identify features of image data. Features of image data may be specific to one or more of the following: construction connectors, construction connector types, fasteners, fastener types, inadequately installed fasteners, missing fasteners, adequately installed fasteners, substrates, installation states, construction connector location candidates, and/or construction connector location candidate types.

In some embodiments, results of a plurality of models may be combined through employment of ensemble learning. Ensemble learning may be based on one or more Random Forests, Bagging, and/or Boosting.

Some embodiments may include one or more optimization algorithms. An optimization algorithm may be employed to improve classification performance of one or more models. Improving classification performance of one or more models may comprise employing the one or more models through a plurality of iterations. For example, A Gradient-weighted Class Activation Mapping (Grad-CAM) framework may be employed for interpretability of one or more classification decisions. For example, gradient descent may be employed to optimize a learning model.

Some embodiments may include one or more data classification models. One or more data classification models may be employed by a classifier. One or more data classification models may be employed to automatically classify image data. One or more data classification models may be configured for binary classification. One or more data classification models may be configured for multiclass classification. One or more data classification models may be configured for multilabel classification. A data classification model may comprise the output of one or more machine learning algorithms executed on training data. Training data may comprise image data. Training data may comprise a combination of one or more of the following: image data, new image data, synthetic image data, labeled samples of image data, labeled samples of synthetic image data, one or more aspects of image data, and/or one or more features identified in image data. A data classification model may employ one or more labels. One or more labels may correlate to one or more classes. A label may be employed to correlate aspects and/or features of image data with aspects and/or features of one or more of the following: construction connectors, fasteners associated with construction connectors, construction connector location candidates, substrates associated with construction connectors, and/or substrates associated with construction connector location candidates. A data classification model may be expanded. Expansion of a data classification model may be based on additional training data. Additional training data may comprise an additional class of data. A data classification model may be based on one or more machine learning models. A data classification model may be based on one or more deep learning models.

Embodiments consistent with the present disclosure may include an automated system for classifying data. The automated system may comprise at least one memory storing instructions, and at least one processor being configured to execute the instructions to perform operations. The operations may comprise automatically obtaining training data comprising image data. The operations may comprise automatically training a data classification model using the training data to generate a trained data classification model. The trained data classification model may be employable to classify new image data.

In some embodiments, operations may comprise automatically obtaining new image data. The new image data may indicate a construction connector. The operations may comprise automatically classifying the new image data. The operations may comprise automatically recognizing a designator associated with the construction connector.

In some embodiments, training data may be obtained from at least one UGV. For example, image data may be captured by one or more imaging systems associated with at least one UGV. The image data may be labeled by one or more users.

In some embodiments, training data may be downloaded from at least one database. Training data downloaded from at least one database may comprise image data.

In some embodiments, training data may comprise synthetic images. Synthetic images may be generated through employment of Generative Adversarial Networks (GANs).

In some embodiments, operations may comprise obtaining additional image data. The operations may comprise retraining a trained data classification model using the additional image data.

In some embodiments, an imaging system associated with a UGV may be employed to capture new image data.

Some embodiments may include automatically identifying an imaging location. Image preprocessing may be employed to identify an imaging location. One or more machine learning algorithms may be employed to identify an imaging location. One or more deep learning algorithms may be employed to identify an imaging location. One or more data classification models may be employed to identify an imaging location based on one or more classifications.

Some embodiments may include automatically identifying one or more features in image data. One or more machine learning algorithms may be employed to identify one or more features in image data. In some embodiments, one or more deep learning models may be employed for automatic feature extraction from image data. The one or more features may comprise one or more of the following: construction connectors, fasteners associated with construction connectors, construction connector location candidates, substrates associated with construction connectors, and/or substrates associated with construction connector location candidates.

Embodiments consistent with the present disclosure may include a computer-implemented method for classifying data. The method may comprise automatically obtaining training data comprising image data. The image data may indicate at least one construction connector. The method may comprise automatically training a data classification model using the training data to generate a trained data classification model. The trained data classification model may be employable to classify new image data. The method may comprise automatically obtaining the new image data. The new image data may indicate a construction connector. The method may comprise automatically classifying the new image data.

In some embodiments, a computer-implemented method may comprise obtaining additional image data. The method may comprise retraining a trained data classification model using the additional image data.

In some embodiments, a computer-implemented method may comprise automatically determining an installation state of a construction connector based on a classification of new image data.

In some embodiments, image data may indicate a plurality of construction connector location candidates. Image data may indicate a construction connector location candidate for a specific construction connector. Image data may indicate a construction connector location candidate for one of a set of specific construction connectors. Image data may indicate a construction connector location candidate for a plurality of specific construction connectors. The one or more specific construction connectors may be based on the capabilities of a UGV. The one or more specific construction connectors may be based on a construction connector carrier associated with a UGV. Image data may indicate a deck joint. Image data may indicate a side scam. Image data may indicate a transition. Image data may indicate at least one edge of at least one substrate material.

In some embodiments, new image data may indicate a construction connector location candidate.

In some embodiments, operations may comprise automatically determining a construction connector type for a construction connector location candidate. The construction connector type may be based on the capabilities of a UGV. The construction connector type may be based on a construction connector carrier associated with a UGV.

Embodiments consistent with the present disclosure may include a computer-implemented method for classifying data. The method may comprise automatically obtaining training data comprising image data. The image data may indicate a plurality of construction connector location candidates. The method may comprise automatically training a data classification model using the training data to generate a trained data classification model. The trained data classification model may be employable to classify new image data. The method may comprise automatically obtaining the new image data. The new image data may indicate a construction connector location candidate. The method may comprise automatically classifying the new image data.

In some embodiments, image data may indicate a construction connector location candidate for a specific construction connector type. Image data may indicate a construction connector location candidate for a subset of construction connector types.

In some embodiments, a computer-implemented method may comprise automatically determining a construction connector type for the construction connector location candidate.

Embodiments consistent with the present disclosure may include at least one memory storing instructions, and at least one processor being configured to execute the instructions to perform operations. The operations may comprise automatically navigating a UGV to an imaging location. The UGV may be navigated to an imaging location through employment of a guidance system, a propulsion system, and an imaging system. The imaging location may be associated with a construction connector, substrate, or other construction component. The imaging location may be associated with a construction connector location candidate. The imaging location may be associated with a building, structure, and/or construction site. The imaging location may comprise a two-dimensional or three-dimensional location. For example, a two-dimensional location may be relative to a known location. For example, a three-dimensional location may comprise a latitude, longitude, and an elevation.

In some embodiments, operations may comprise automatically capturing image data. The image data may indicate a construction connector. The image data may comprise still images, video, and/or live stream video.

In some embodiments, operations may comprise automatically classifying image data through employment of a classifier. A classifier may comprise instructions, which when executed by a processor, cause the processor to process and classify image data. A classifier may employ one or more trained data classification models. The classifier may be based on construction connector training data. The construction connector training data may be related to a plurality of construction connectors. The construction connector training data may comprise a plurality of images. The construction connector training data may comprise labeled image data indicating a plurality of construction connectors. Classification operations may be conducted onboard a UGV. Alternatively, classification operations may be conducted on at least one remote server in communication with a UGV. A plurality of construction connectors may comprise one or more construction connector types.

In some embodiments, operations may comprise automatically determining an installation state of a construction connector based on a classification. Determining an installation state may be further based on location and/or one or more construction requirements. For example, determining an installation state may be based on a construction code that applies to a location within a specific jurisdiction. The installation state may indicate an improper installation. An improper installation may be related to a construction connector and/or associated fasteners. The installation state may indicate one or more missing fasteners associated with the construction connector. The installation state may indicate one or more inadequately installed fasteners associated with the construction connector. The one or more inadequately installed fasteners may indicate an inadequate fastener size, an inadequate fastener type, and/or inadequate penetration of one or more fasteners into a substrate.

In some embodiments, operations may comprise automatically tagging an imaging location. An imaging location may be tagged for future rectification of an improperly installed construction connector. An imaging location may be tagged for further investigation of an improperly installed construction connector. Examples of improperly installed construction connectors include, but are not limited to, one or more missing fasteners, one or more inadequately installed fasteners, a mislocated construction connector, a damaged construction connector, one or more damaged fasteners, or any other unfulfilled requirement of a properly installed construction connector. An imaging location may be tagged for future installation of a construction connector and fasteners. An imaging location may be tagged for future attachment of decking to one or more substrates. The imaging location may be associated with image data captured at the imaging location.

In some embodiments, a UGV may comprise one or more fastener carriers. A fastener carrier may be configured to carry a plurality of fasteners. The UGV may comprise a first effector. The first effector may be configured to position a fastener from the fastener carrier into a fastener receptacle of a construction connector. The UGV may comprise a second effector. The second effector may be configured to install the fastener through the construction connector to a substrate behind the construction connector. The first effector may be operated by a robotic arm. The second effector may be operated by a robotic arm. A robotic arm may be configured to reach below the bottom of the UGV. A robotic arm may be configured to reach above the top of the UGV. Fasteners may be installed through fastener receptacles of the construction connector. The second effector may be configured to install fasteners through the construction connector to a substrate behind the construction connector at angles other than 90 degrees to a surface of the construction connector. The second effector may comprise one or more fastener alignment guides. A fastener alignment guide may be employed to align a fastener at a specific angle relative to a surface of the construction connector. The first effector and the second effector may be part of the same effector. Operations may comprise automatically installing one or more fasteners. Installing one or more fasteners may be based on at least one or more of the following: a fastener type, a construction connector type, a substrate type, and/or classified image data.

In some embodiments, a UGV may comprise one or more washer carriers. A washer carrier may be configured to carry a plurality of washers. The washers may be required for installation of specific fasteners and/or fasteners in specific construction connectors. The washers may be required for arc spot welds.

In some embodiments, operations may comprise automatically installing one or more missing fasteners through employment of an imaging system and one or more effectors. The missing fasteners may be associated with a construction connector. The missing fasteners may be associated with one or more fastener receptacles associated with a construction connector. For example, a construction connector may comprise a plurality of fastener receptacles. In some example installations of construction connectors, each of the fastener receptacles may require a fastener to be installed. In other example installations of construction connectors, a subset of the fastener receptacles may require a fastener to be installed.

In some embodiments, an effector may comprise a nail gun. A nail gun may be referred to as a nailer. The nail gun may comprise an electric nail gun. The nail gun may comprise a pneumatic nail gun. An effector may comprise an electric hammer, a pneumatic hammer, a hammer drill, a hydraulic piston, a slag hammer, and/or any other impact device. The effector may comprise a pressure sensor. The pressure sensor may be configured to measure a pressure applied to a fastener during installation. Measuring a pressure may comprise an estimation of pressure. The pressure sensor may be configured to communicate pressure sensor data. The pressure sensor data may be stored in a database. The pressure sensor data may be correlated with location data. The location data may be specific to one or more fasteners.

In some embodiments, an effector may comprise a screw gun. The screw gun may comprise an electric screw gun. The screw gun may comprise a pneumatic screw gun. An effector may comprise an impact driver. The impact driver may comprise an electric impact driver. The impact driver may comprise a pneumatic impact driver. An effector may comprise a ratchet. The ratchet may comprise an electric ratchet. The ratchet may comprise a pneumatic ratchet. An effector may comprise an impact wrench. The impact wrench may comprise an electric impact wrench. The impact wrench may comprise a pneumatic impact wrench. An effector may comprise a wrench or other torsional applicator. The effector may comprise a torque sensor. The torque sensor may be configured to measure a torque applied to a fastener during installation. Measuring a torque may comprise an estimation of torque. The torque sensor may be configured to communicate torque sensor data. The torque sensor data may be stored in a database. The torque sensor data may be correlated with location data.

In some embodiments, an effector may be configured to secure a first substrate to a second substrate. The effector may comprise a welder. The effector may comprise a rotary tool. The rotary tool may comprise a wire brush. The effector may comprise a button punch tool. The effector may comprise a crimping tool. The effector may comprise a PunchLok II tool. The effector may comprise a paint applicator. The paint applicator may be configured to apply galvanized paint to a weld, punched hole, and/or crimp. The effector may be configured for quiet operation. The effector may comprise an adhesive applicator. The effector may comprise a foam applicator and/or foam insulation applicator. The effector may comprise a lubricant applicator.

In some embodiments, a UGV may comprise one or more electrode carriers. An electrode carrier may be configured to carry a plurality of electrodes. The electrodes may be required for welding operations.

In some embodiments, operations may comprise automatically securing a first substrate to a second substrate through employment of a UGV comprising an effector. For example, metal deck may be automatically installed to structural steel through employment of a welder. Welding operations may be timed. Times for each welding operation may be stored. Times for each welding operation may be associated with an imaging location for each welding operation. For example, composite decking may be automatically installed to dimensional lumber through employment of a screw gun.

In some embodiments, operations may comprise automatically verifying adequate welds. Verifying adequate welds may be based on an imaging system associated with a UGV. Verifying adequate welds may comprise employment of a slag hammer. Verifying adequate welds may comprise employment of a wire brush.

In some embodiments, operations may comprise automatically verifying adequate installation of a fastener through a construction connector. Verifying adequate installation may be based on an imaging system and a pressure sensor. Verifying adequate installation may be based on an imaging system and a torque sensor. The operations may comprise capturing new image data. The new image data may be captured after installation of a fastener by a UGV. The operations may comprise automatically classifying the new image data. In cases where installation of the fastener is inadequate, the operations may comprise rectifying the inadequately installed fastener. For example, in cases where the fastener is a nail and penetration into a substrate is inadequate, the operations may comprise completing installation of the nail through employment of an effector comprising an impact device. For example, in cases where the fastener is a screw and penetration into a substrate is inadequate, the operations may comprise completing installation of the screw through employment of an effector comprising an impact device. Alternatively, the operations may comprise removing the screw and installing another screw. In cases where adequate installation cannot be achieved, the operations may comprise tagging an image location. Image data indicating the construction connector and/or one or more fasteners associated with the construction connector may be associated with the tagged image location.

In some embodiments, operations may comprise automatically storing image data. Image data may be stored onboard a UGV. Image data may be communicated by a UGV to a remote database.

In some embodiments, a UGV may comprise an effector. The effector may be configured to remove inadequately installed fasteners. The effector may comprise a fastener remover. The effector may be operated by a robotic arm. The effector may be integrated with one or more additional effectors. Operations may comprise automatically removing one or more inadequately installed fasteners through employment of an imaging system and the effector.

In some embodiments, a UGV may comprise an automated winch. The automated winch may be configured to anchor the UGV to a structure. The automated winch may be employed when the UGV is located on a sloped roof. The automated winch may be employed when the UGV is located on a vertical wall or vertical structural component.

In some embodiments, a UGV may comprise a plurality of automated magnets. The automated magnets may be configured to anchor the UGV to a structure. The automated magnets may be employed when the UGV is located on a sloped roof. The automated magnets may be employed when the UGV is located on a vertical wall or vertical structural component. The automated magnets may be employed when the UGV is located in an overhead position.

In some embodiments, a UGV may comprise a Ground Penetrating Radar (GPR) sensor. The GPR sensor may be employed to determine an installation state. The GPR sensor may be employed to determine that a construction connector is required at a construction connector location candidate. For example, a GPR sensor may be employed to determine absence of utilities at a construction connector location candidate. The GPR sensor may be employed to determine a construction connector type for a construction connector location candidate. Some construction connectors may be at least partially concealed once installed. The GPR sensor may be employed to determine one or more adequate welds. The GPR sensor may be configured to communicate GPR sensor data. The GPR sensor data may be stored in a database. The GPR sensor data may be correlated with location data. The location data may be specific to one or more construction connectors. The location data may be specific to one or more construction connector location candidates. The location data may be specific to one or more welds.

In some embodiments, a UGV may comprise a LiDAR sensor. The LiDAR sensor may be employed to determine an installation state. The LiDAR sensor may be employed to determine that a construction connector is required at a construction connector location candidate. The LiDAR sensor may be employed to determine a construction connector type for a construction connector location candidate. The LiDAR sensor may be configured to communicate LiDAR sensor data. The LiDAR sensor data may be stored in a database. The LiDAR sensor data may be correlated with location data.

In some embodiments, a UGV may comprise a SONAR sensor. The SONAR sensor may be employed to determine an installation state. The SONAR sensor may be employed to determine that a construction connector is required at a construction connector location candidate. The SONAR sensor may be employed to determine a construction connector type for a construction connector location candidate. The SONAR sensor may be configured to communicate SONAR sensor data. The SONAR sensor data may be stored in a database. The SONAR sensor data may be correlated with location data.

In some embodiments, a UGV may comprise a Ultrasonic Testing (UT) sensor. The UT sensor may be employed to determine an installation state. The UT sensor may be employed to determine that a construction connector is required at a construction connector location candidate. The UT sensor may be employed to determine a construction connector type for a construction connector location candidate. The UT sensor may be configured to communicate UT sensor data. The UT sensor data may be stored in a database. The UT sensor data may be correlated with location data.

In some embodiments, a UGV may comprise an inductive sensor. The inductive sensor may be employed to determine an installation state. The inductive sensor may be employed to determine that a construction connector is required at a construction connector location candidate. The inductive sensor may be employed to determine a construction connector type for a construction connector location candidate. The inductive sensor may be configured to communicate inductive sensor data. The inductive sensor data may be stored in a database. The inductive sensor data may be correlated with location data.

In some embodiments, a UGV may comprise a construction connector carrier. The construction connector carrier may be configured to carry at least one construction connector. The construction connector carrier may be configured to carry one construction connector type. The UGV may comprise a first effector. The first effector may be configured to position a construction connector from the construction connector carrier. The construction connector may be positioned adjacent to one or more substrates. The UGV may comprise a second effector. The second effector may be configured to install fasteners through the construction connector. The first effector may be operated by a first robotic arm. The second effector may be operated by a second robotic arm. Fasteners may be installed through the construction connector to the one or more substrates. The first effector and the second effector may be part of the same effector. The first robotic arm and the second robotic arm may be part of the same robotic arm. Operations may comprise automatically installing the construction connector and the fasteners. Installing the construction connector and the fasteners may be based on at least one or more of the following: a fastener type, a construction connector type, a substrate type, and/or classified image data.

In some embodiments, a UGV may comprise a plurality of construction connector carriers. Each of the construction connector carriers may be configured to carry at least one construction connector. Each of the construction connector carriers may be configured to carry one construction connector type.

In some embodiments, operations may comprise automatically navigating a UGV to a construction connector location. The operations may comprise automatically capturing image data through employment of a first imaging system. The image data may indicate a construction connector. The operations may comprise automatically removing the construction connector through employment of a second imaging system and an effector. For example, a different construction connector type may be required at the construction connector location. For example, the construction connector may not be desired at the construction connector location. For example, the construction connector may have been installed at the wrong location. The first imaging system and the second imaging system may be part of the same imaging system.

In some embodiments, operations may comprise automatically capturing image data. The image data may indicate a construction connector location candidate. The construction connector location candidate may comprise one or more substrates. The construction connector location candidate may comprise one or more construction connector location candidate types. A construction connector location candidate type may comprise one or more deck joints, side seams, transitions, edges of at least one substrate material, and/or any other location where installation of a construction connector may be desired.

In some embodiments, operations may comprise automatically classifying image data through employment of a classifier. A classifier may comprise instructions, which when executed by a processor, cause the processor to process and classify image data. A classifier may employ one or more trained data classification models. The classifier may be based on construction connector location training data. The construction connector location training data may be related to a plurality of construction connector location candidates. The construction connector location training data may comprise a plurality of images. The construction connector location training data may comprise labeled image data indicating a plurality of construction connector location candidates. Classification operations may be conducted onboard a UGV. Alternatively, classification operations may be conducted on at least one remote server in communication with a UGV. A plurality of construction connector location candidates may be related to potential installation locations for one or more construction connector types.

In some embodiments, operations may comprise automatically determining that a construction connector is required at a construction connector location candidate based on a classification. Determining that a construction connector is required at a construction connector location candidate may be further based on location and/or one or more construction requirements. For example, determining that a construction connector is required at a construction connector location candidate may be based on a construction code that applies to a location within a specific jurisdiction.

In some embodiments, operations may comprise automatically installing a construction connector and fasteners at a construction connector location candidate through employment of an imaging system and one or more effectors. One of the one or more effectors may be configured to install the fasteners through the construction connector to a substrate behind the construction connector at angles other than 90 degrees to a surface of the construction connector.

In some embodiments, operations may comprise automatically verifying adequate installation of a construction connector and fasteners. Verifying adequate installation may be based on an imaging system and a pressure sensor. Verifying adequate installation may be based on an imaging system and a torque sensor. The operations may comprise capturing new image data. The new image data may be captured after installation of a construction connector and fasteners by a UGV. The operations may comprise automatically classifying the new image data.

In some embodiments, operations may comprise automatically storing new image data. New image data may be stored onboard a UGV. New image data may be communicated by a UGV to a remote database.

In some embodiments, a UGV may comprise a Ground Penetrating Radar (GPR) sensor. The GPR sensor may be employed to determine that a construction connector is required at a construction connector location candidate. The GPR sensor may be employed in verifying adequate installation of a construction connector and fasteners. Some construction connectors may be at least partially concealed once installed. The GPR sensor may be employed to determine that one or more welds are required at a weld location candidate. The GPR sensor may be employed to determine one or more adequate welds. The GPR sensor may be employed to estimate the thickness of one or more substrates.

Embodiments consistent with the present disclosure may include a plurality of UGVs. Each of the UGVs may be configured to one task or a plurality of tasks. For example, a first UGV may comprise an imaging system and one or more batteries. Another UGV may be configured to swap out one or more batteries with one or more charged batteries. The first UGV may be configured to tag an imaging location. For example, a second UGV may comprise a first effector. Another UGV may be configured to swap out the first effector with a second effector. Alternatively, the other UGV may comprise the second effector. For example, a third UGV may comprise a fastener carrier. Another UGV may be configured to refill the fastener carrier. For example, a fourth UGV may comprise a construction connector carrier. Another UGV may be configured to refill the construction connector carrier. For example, a second UGV may be configured to partially install construction connectors. Another UGV may be configured to further installation of partially installed construction connectors. Another UGV may be configured to complete installation of partially installed construction connectors. The other UGV may be configured to verify adequate installation. Alternatively, the first UGV may be configured to verify adequate installation.

Reference will now be made in detail to example embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 is a block diagram of an example Unmanned Ground Vehicle (UGV) 110 configured to determine an installation state of an example construction connector 160, consistent with disclosed embodiments. UGV 110 may comprise one or more robotic arms (111, 112). UGV 110 may comprise an imaging system 120. Imaging system 120 may be attached to or integrated into first robotic arm 111. Imaging system 120 may be employed to identify an imaging location. In this example, the imaging location may comprise a location where images of construction connector 160 may be captured. Imaging system 120 may be employed to navigate UGV 110 to the imaging location. Construction connector 160 may be fastened to one or more substrates 170 through employment of a plurality of fasteners (161, 162). UGV 110 may comprise effector 122. Effector 122 may be attached to or integrated into second robotic arm 112. UGV 110 may comprise fastener carrier 140. Fastener carrier 140 may be configured to carry a plurality of fasteners. UGV 110 may comprise construction connector carrier 142. Construction connector carrier 142 may be configured to carry at least one construction connector. UGV 110 may be configured to communicate to one or more networks 180 via network connection 183. Network connection 183 may comprise a wired, wireless, or a combination of wired and wireless connections. One or more networks 180 may be in communication with database 190 via network connection 187. Network connection 187 may be a wired, wireless, or a combination of wired and wireless connections.

Figure 2:
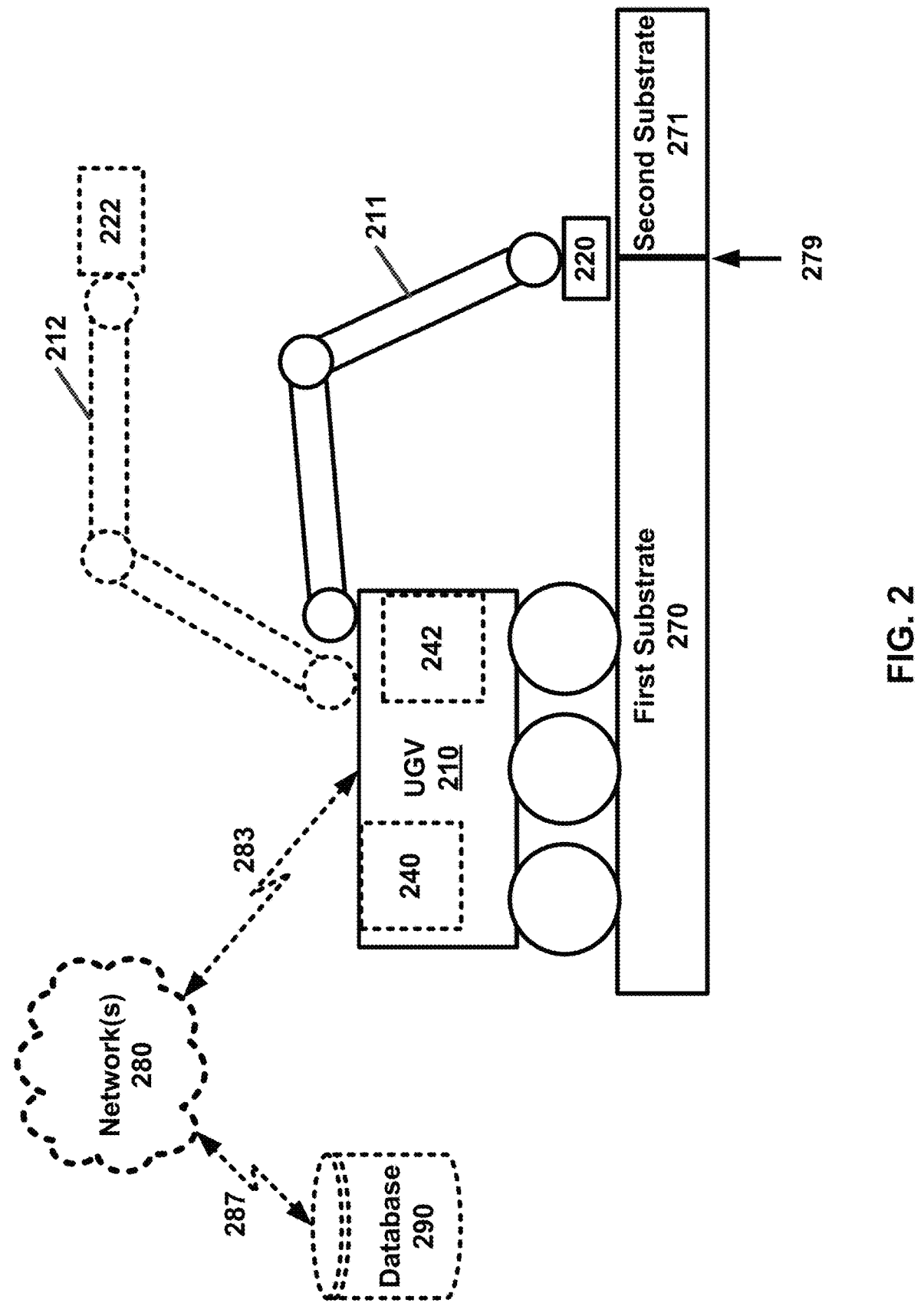
FIG. 2 is a block diagram of an example UGV configured to determine that a construction connector is required at an example construction connector location candidate, consistent with disclosed embodiments.

FIG. 2 is a block diagram of an example UGV 210 configured to determine that a construction connector is required at an example construction connector location candidate 279, consistent with disclosed embodiments. UGV 210 may comprise one or more robotic arms (211, 212). UGV 210 may comprise an imaging system 220. Imaging system 220 may be attached to or integrated into first robotic arm 211. Imaging system 220 may be employed to identify an imaging location. In this example, the imaging location may comprise a location where images of construction connector location candidate 279 may be captured. Imaging system 220 may be employed to navigate UGV 210 to the imaging location. Construction connector location candidate 279 may comprise a location where a construction connector (e.g., 160) may be required. In this example, construction connector location candidate 279 comprises an edge of first substrate 270 butted up against an edge of second substrate 271. UGV 210 may comprise effector 222. Effector 222 may be attached to or integrated into second robotic arm 212. UGV 210 may comprise fastener carrier 240. Fastener carrier 240 may be configured to carry a plurality of fasteners. UGV 210 may comprise construction connector carrier 242. Construction connector carrier 242 may be configured to carry at least one construction connector. UGV 210 may be configured to communicate to one or more networks 280 via network connection 283. Network connection 283 may comprise a wired, wireless, or a combination of wired and wireless connections. One or more networks 280 may be in communication with database 290 via network connection 287. Network connection 287 may be a wired, wireless, or a combination of wired and wireless connections.

Figure 3:
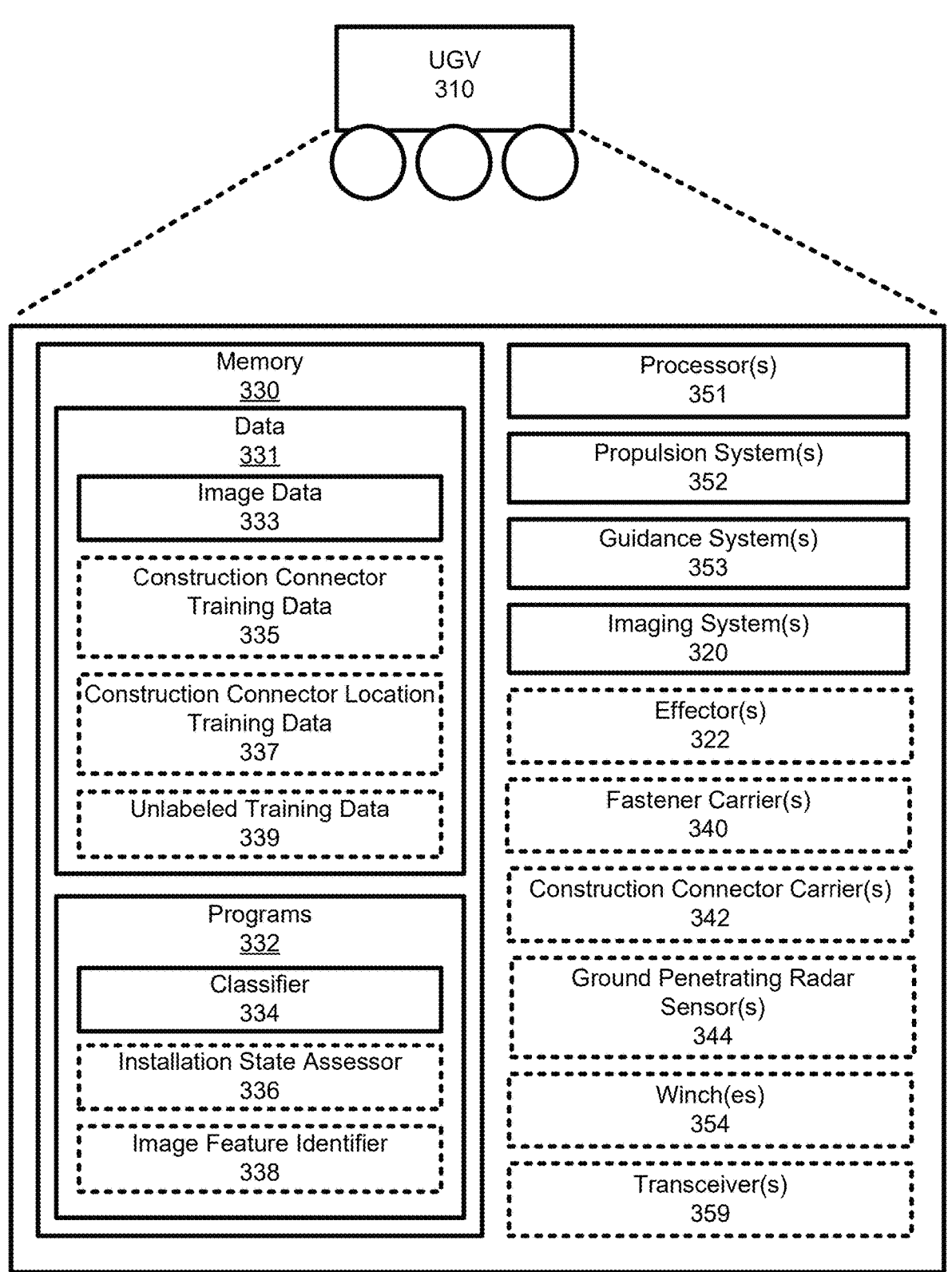
FIG. 3 is a block diagram of an example UGV configured to classify image data, consistent with disclosed embodiments.

FIG. 3 is a block diagram of an example UGV 310 configured to classify image data, consistent with disclosed embodiments. UGV 310 may comprise at least one memory 330. Memory 330 may comprise data 331 and programs 332. Data 331 may comprise image data 333. Data 331 may comprise construction connector training data 335. Data 331 may comprise construction connector location training data 337. Data 331 may comprise unlabeled training data 339. Programs 332 may comprise classifier 334. Programs 332 may comprise installation state assessor 336. Installation state assessor 336 may be configured to automatically determine an installation state of a construction connector. Programs 332 may comprise image feature identifier 338. Image feature identifier 338 may be configured to identify one or more features in image data 333. UGV 310 may comprise one or more processors 351. UGV 310 may comprise one or more propulsion systems 352. UGV 310 may comprise one or more guidance systems 353. UGV 310 may comprise one or more imaging systems 320. UGV 310 may comprise one or more effectors 322. UGV 310 may comprise one or more fastener carriers 340. UGV 310 may comprise one or more construction connector carriers 342. UGV 310 may comprise one or more Ground Penetrating Radar (GPR) sensors 344. UGV 310 may comprise one or more winches 354. UGV 310 may comprise one or more transceivers 359. One or more transceivers 359 may be configured to communicate with one or more networks (e.g., 180, 280, 580). One or more transceivers 359 may be configured to communicate with one or more remote devices. One or more transceivers 359 may be configured to communicate with one or more additional UGVs.

Figure 4:
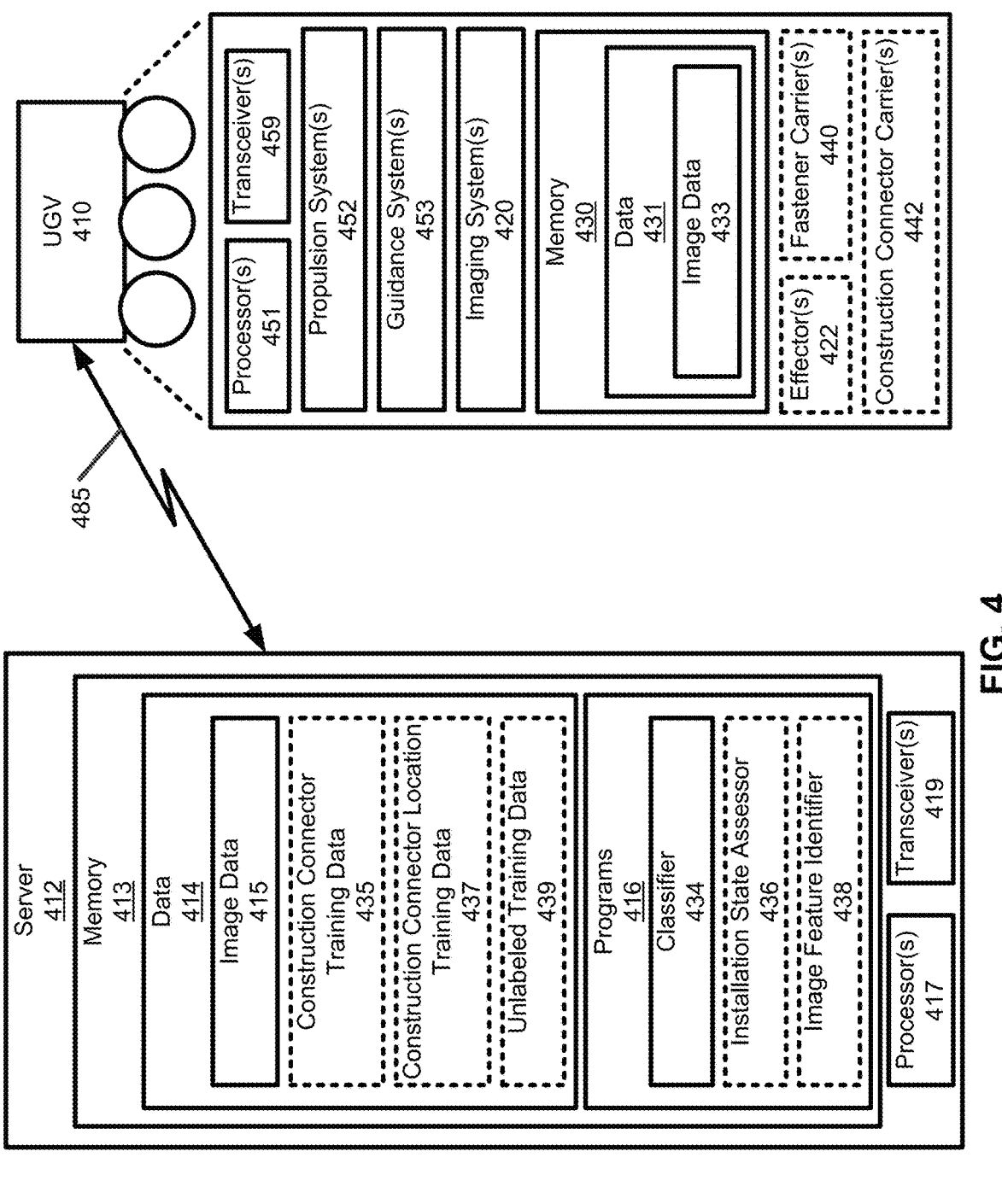
FIG. 4 is a block diagram of a first example UGV system configured to classify image data, consistent with disclosed embodiments.

FIG. 4 is a block diagram of a first example UGV system 400 configured to classify image data, consistent with disclosed embodiments. UGV system 400 may comprise at least one UGV 410. UGV system 400 may comprise at least one server 412. UGV 410 may comprise at least one memory 430. Memory 430 may comprise data 431. Data 431 may comprise image data 433. UGV 410 may comprise one or more processors 451. UGV 410 may comprise one or more propulsion systems 452. UGV 410 may comprise one or more guidance systems 453. UGV 410 may comprise one or more imaging systems 420. UGV 410 may comprise one or more effectors 422. UGV 410 may comprise one or more fastener carriers 440. UGV 410 may comprise one or more construction connector carriers 442. UGV 410 may comprise one or more transceivers 459. One or more transceivers 459 may be configured to communicate with at least one server 412 via network connection 485. One or more transceivers 459 may be configured to communicate with one or more networks (e.g., 180, 280, 580). One or more transceivers 459 may be configured to communicate with one or more remote devices. One or more transceivers 459 may be configured to communicate with one or more additional UGVs. At least one server 412 may comprise at least one memory 413. At least one memory 413 may comprise data 414 and programs 416. Data 414 may comprise image data 415. Data 414 may comprise construction connector training data 435. Data 414 may comprise construction connector location training data 437. Data 414 may comprise unlabeled training data 439. Programs 416 may comprise classifier 434. Programs 416 may comprise installation state assessor 436. Programs 416 may comprise image feature identifier 438. At least one server 412 may comprise one or more processors 417. At least one server 412 may comprise one or more transceivers 419. One or more transceivers 419 may be configured to communicate with at least one UGV 410 via network connection 485. One or more transceivers 419 may be configured to communicate with one or more networks (e.g., 180, 280, 580). One or more transceivers 419 may be configured to communicate with one or more remote devices.

Figure 5:
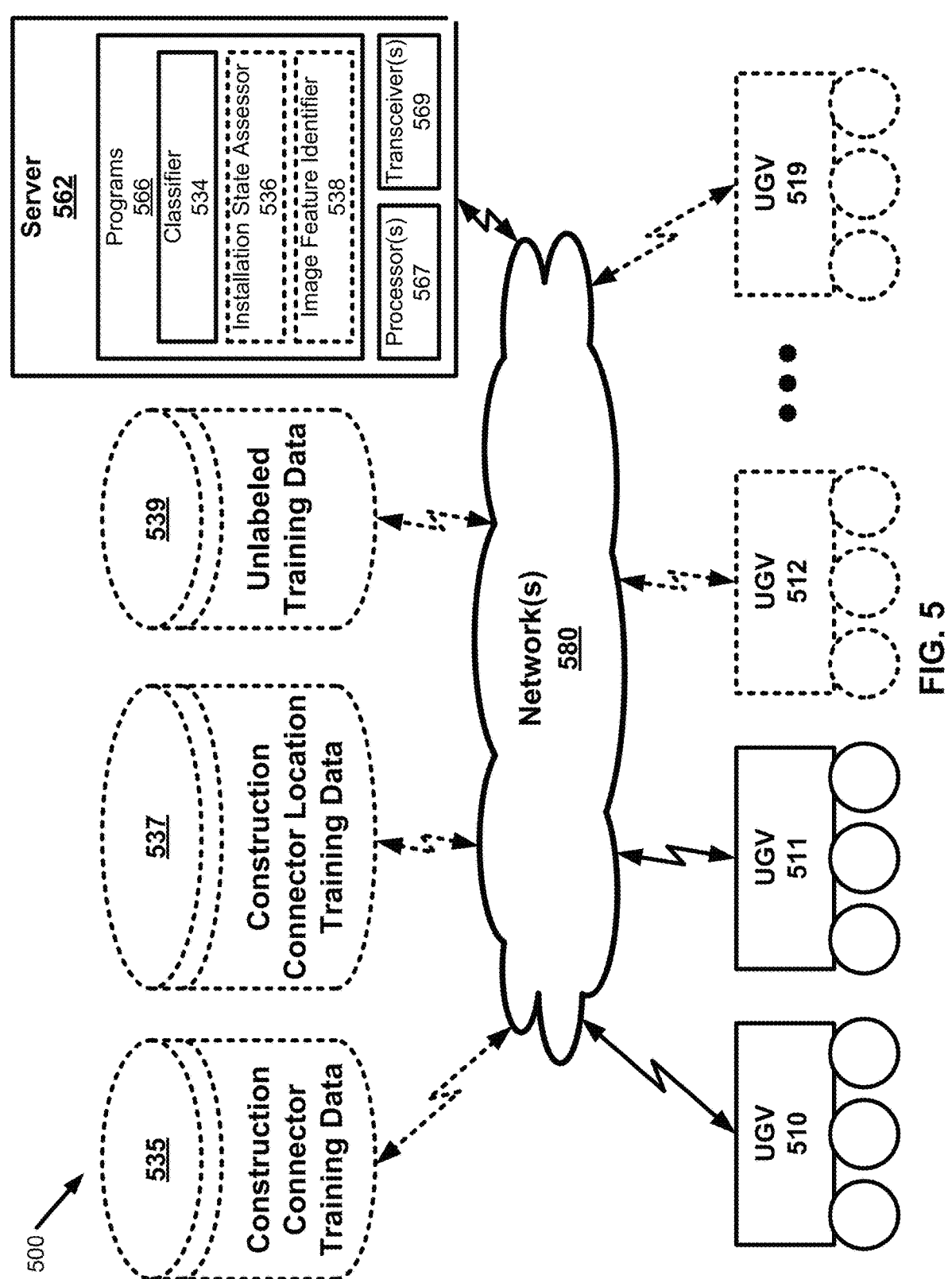
FIG. 5 is a block diagram of a second example UGV system for classifying image data acquired by a plurality of example UGVs, consistent with disclosed embodiments.

FIG. 5 is a block diagram of a second example UGV system 500 for classifying image data acquired by a plurality of example UGVs (510, 511, 512, . . . , 519), consistent with disclosed embodiments. UGV system 500 may comprise a plurality of UGVs (510, 511, 512, . . . , 519). The plurality of UGVs (510, 511, 512, . . . , 519) may be configured to communicate with network 580. UGV system 500 may comprise server 562. Server 562 may be configured to communicate with network 580. UGV system 500 may comprise unlabeled training data 539. Unlabeled training data 539 may be in communication with network 580. UGV system 500 may comprise construction connector training data 535. Construction connector training data 535 may be in communication with network 580. UGV system 500 may comprise construction connector location training data 537. Construction connector location training data 537 may be in communication with network 580. Server 562 may comprise programs 566, one or more processors 567, and one or more transceivers 569. Programs 566 may comprise classifier 534. Programs 566 may comprise installation state assessor 536. Programs 566 may comprise image feature identifier 538. One or more transceivers 569 may be configured to communicate with network 580. Alternatively, one or more transceivers 569 may be configured to communicate with one or more UGVs (e.g., 510, 511, 512, . . . , 519) directly. Unlabeled training data 539 may be associated with server 562. One or more transceivers 569 may be configured to communicate with unlabeled training data 539 directly. Construction connector training data 535 may be associated with server 562. One or more transceivers 569 may be configured to communicate with construction connector training data 535 directly. Construction connector location training data 537 may be associated with server 562. One or more transceivers 569 may be configured to communicate with construction connector location training data 537 directly.

FIG. 6 is a flow diagram of an example process for determining an installation state of a construction connector, consistent with disclosed embodiments. A UGV may be navigated to an imaging location through employment of a guidance system, a propulsion system, and an imaging system at 610. Image data may be captured at 620. The image data may indicate a construction connector. The image data may be classified through employment of a classifier at 630. The classifier may be based on construction connector training data. An installation state of the construction connector may be determined at 640. Determining the installation state may be based on the classification. The installation state may be determined to indicate one or more missing fasteners associated with the construction connector at 650. One or more missing fasteners may be installed through employment of the imaging system and an effector at 660. Adequate installation of a fastener may be verified at 670. Verifying the adequate installation may be based on the imaging system and a pressure sensor. Adequate installation of a fastener may be verified at 675. Verifying the adequate installation may be based on the imaging system and a torque sensor. Image data may be stored at 680. The installation state may be determined to indicate one or more inadequately installed fasteners associated with the construction connector at 690. One or more of the inadequately installed fasteners may be removed through employment of the imaging system and the effector at 695.

Figure 7:
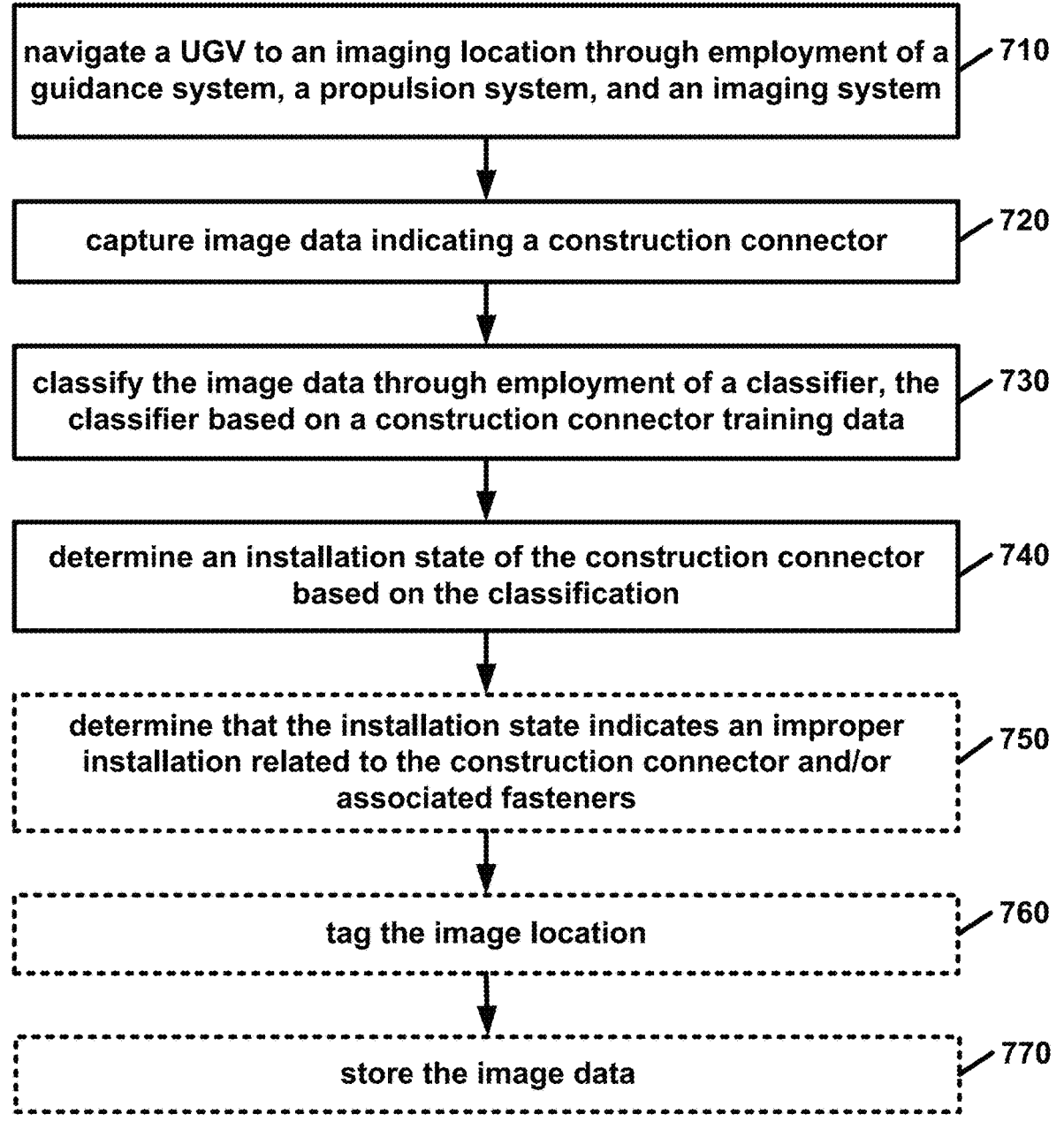
FIG. 7 is a flow diagram of an example process for determining an installation state of a construction connector and tagging an imaging location, consistent with disclosed embodiments.

FIG. 7 is a flow diagram of an example process for determining an installation state of a construction connector and tagging an imaging location, consistent with disclosed embodiments. A UGV may be navigated to an imaging location through employment of a guidance system, a propulsion system, and an imaging system at 710. Image data may be captured at 720. The image data may indicate a construction connector. The image data may be classified through employment of a classifier at 730. The classifier may be based on construction connector training data. An installation state of the construction connector may be determined at 740. Determining the installation state may be based on the classification. The installation state may be determined to indicate an improper installation related to the construction connector and/or associated fasteners at 750. The image location may be tagged at 760. Image data may be stored at 770.

FIG. 8 is a flow diagram of an example process for determining that a construction connector is required at a construction connector location candidate, consistent with disclosed embodiments. A UGV may be navigated to an imaging location through employment of a guidance system, a propulsion system, and an imaging system at 810. Image data may be captured at 820. The image data may indicate a construction connector location candidate. The image data may be classified through employment of a classifier at 830. The classifier may be based on construction connector location training data. A construction connector may be determined to be required at the construction connector location candidate at 840. Determining that the construction connector is required at the construction connector location candidate may be based on the classification. The construction connector and fasteners may be installed at the construction connector location candidate through employment of one or more effectors at 850. Adequate installation of the construction connector and the fasteners may be verified at 860. Verifying the adequate installation may be based on the imaging system and a pressure sensor. Adequate installation of the construction connector and the fasteners may be verified at 865. Verifying the adequate installation may be based on the imaging system and a torque sensor. Image data may be stored at 870.

FIG. 9 is a flow diagram of an example process for determining that a construction connector is required at a construction connector location candidate and tagging an imaging location, consistent with disclosed embodiments. A UGV may be navigated to an imaging location through employment of a guidance system, a propulsion system, and an imaging system at 910. Image data may be captured at 920. The image data may indicate a construction connector location candidate. The image data may be classified through employment of a classifier at 930. The classifier may be based on construction connector location training data. A construction connector may be determined to be required at the construction connector location candidate at 940. Determining that the construction connector is required at the construction connector location candidate may be based on the classification. The image location may be tagged at 950. Image data may be stored at 960.

Figure 10:
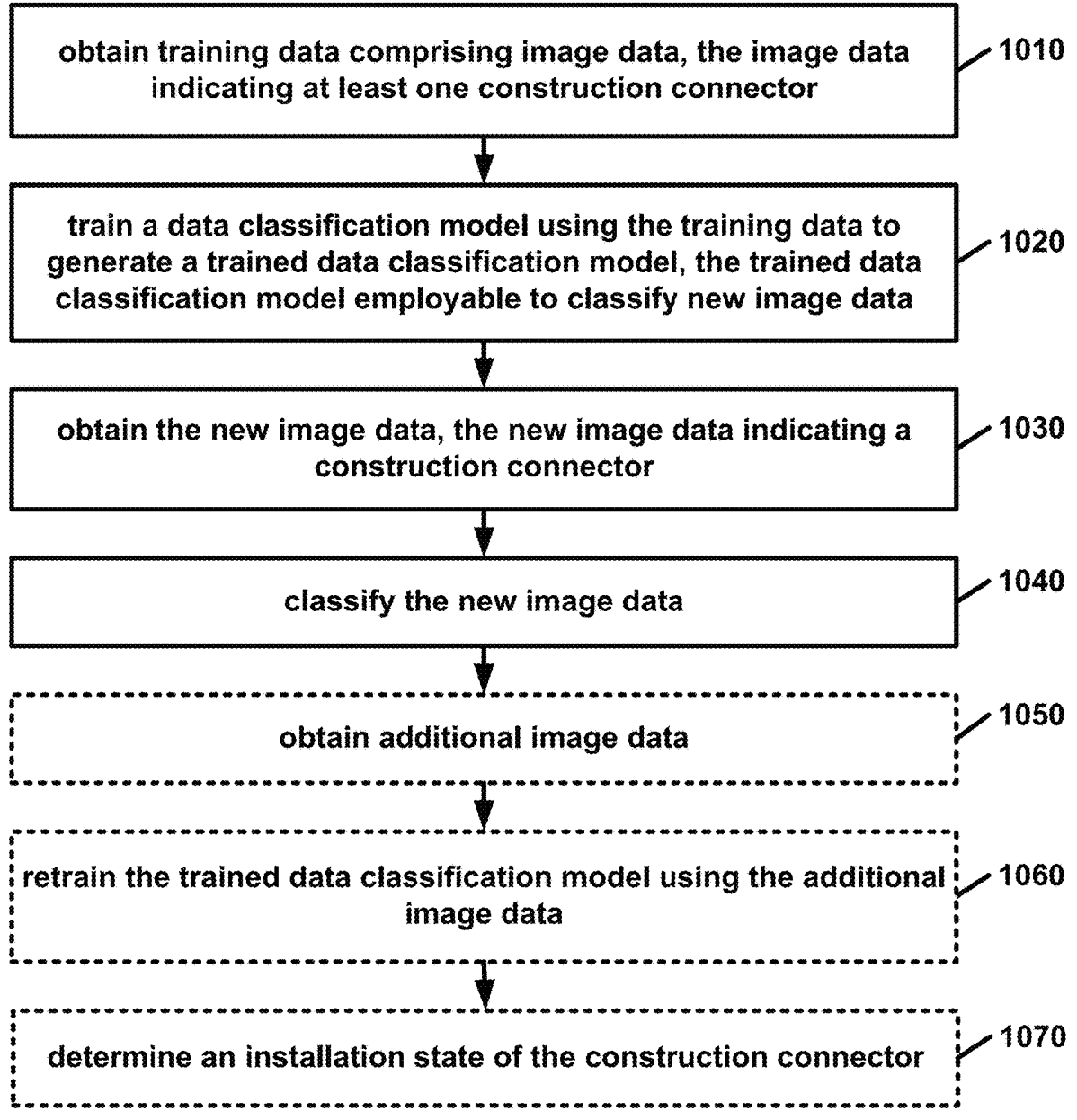
FIG. 10 is a flow diagram of an example process for classifying image data associated with construction connectors, consistent with disclosed embodiments.

FIG. 10 is a flow diagram of an example process for classifying image data associated with construction connectors, consistent with disclosed embodiments. Training data may be obtained at 1010. The training data may comprise image data. The image data may indicate any combination of: a plurality of construction connectors, at least one construction connector type, a plurality of fasteners, at least one substrate, at least one substrate type, and/or a plurality of installation states. A data classification model may be trained using the training data to generate a trained data classification model at 1020. The trained data classification model may be employable to classify new image data. New image data may be obtained at 1030. The new image data may indicate a construction connector. The new image data may be classified at 1040. Additional image data may be obtained at 1050. The trained data classification model may be retrained using the additional image data at 1060. An installation state of the construction connector may be determined at 1070.

FIG. 11 is a flow diagram of an example process for classifying image data associated with construction connector location candidates, consistent with disclosed embodiments. Training data may be obtained at 1110. The training data may comprise image data. The image data may indicate any combination of: a plurality of construction connector location candidates, at least one substrate, and/or at least one substrate type. A data classification model may be trained using the training data to generate a trained data classification model at 1120. The trained data classification model may be employable to classify new image data. New image data may be obtained at 1130. The new image data may indicate a construction connector location candidate. The new image data may be classified at 1140. Additional image data may be obtained at 1150. The trained data classification model may be retrained using the additional image data at 1160. A construction connector type for the construction connector location candidate may be determined at 1170.

Figure 12A:
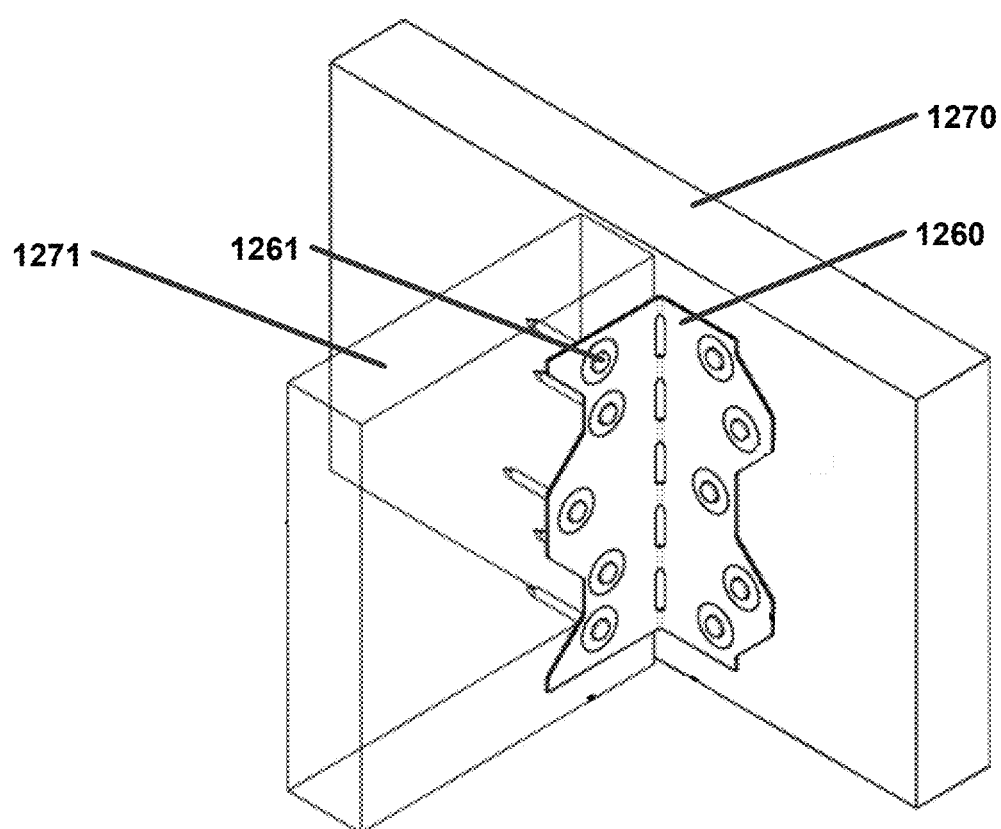
FIGS. 12A and 12B illustrate first and second example installed construction connectors in the prior art on which disclosed embodiments may be practiced.
Figure 12B:
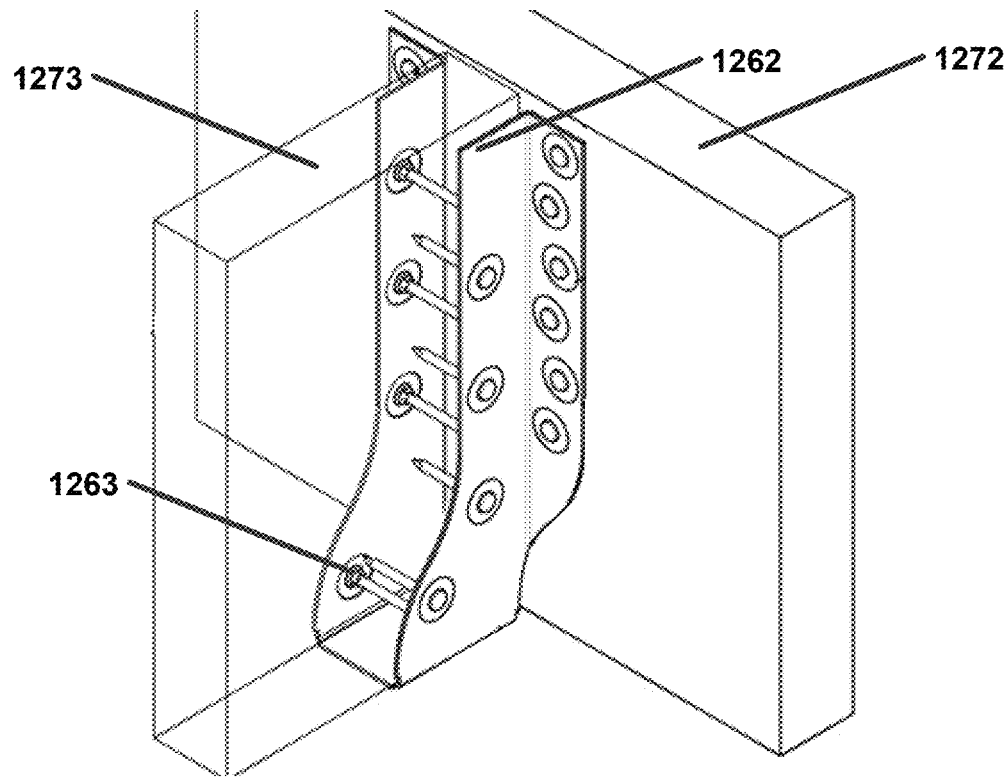

FIGS. 12A and 12B illustrate first and second example installed construction connectors (1260, 1262) in the prior art on which disclosed embodiments may be practiced. FIG. 12A illustrates an example installed framing angle by MiTek®. A framing angle by MiTek® may be considered a first construction connector type. Construction connector 1260 comprises a multiplane construction connector. Construction connector 1260 may be installed to a first substrate 1270 and a second substrate 1271. Construction connector 1260 may be installed to the substrates through employment of a plurality of fasteners 1261. FIG. 12B illustrates an example installed face mount hanger by MiTek®. A face mount hanger by MiTek® may be considered a second construction connector type. Construction connector 1262 comprises a multiplane construction connector. Construction connector 1262 may be installed to a first substrate 1272 and a second substrate 1273. Construction connector 1262 may be installed to the substrates through employment of a plurality of fasteners 1263.

Figure 13A:
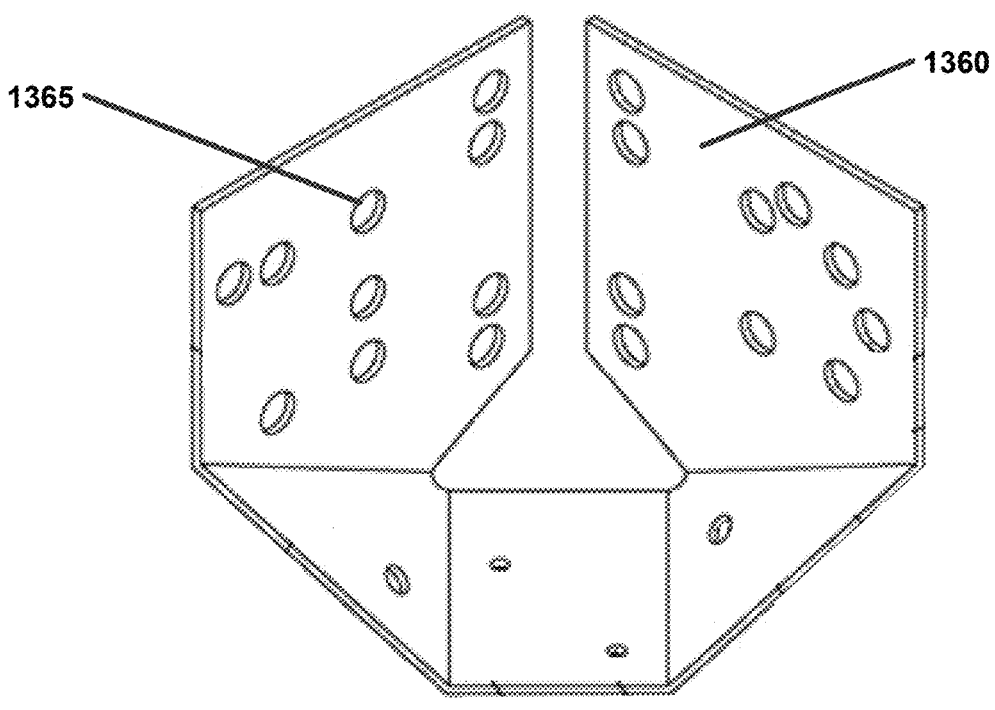
FIGS. 13A and 13B illustrate various configurations of a first example uninstalled construction connector in the prior art on which disclosed embodiments may be practiced.
Figure 13B:
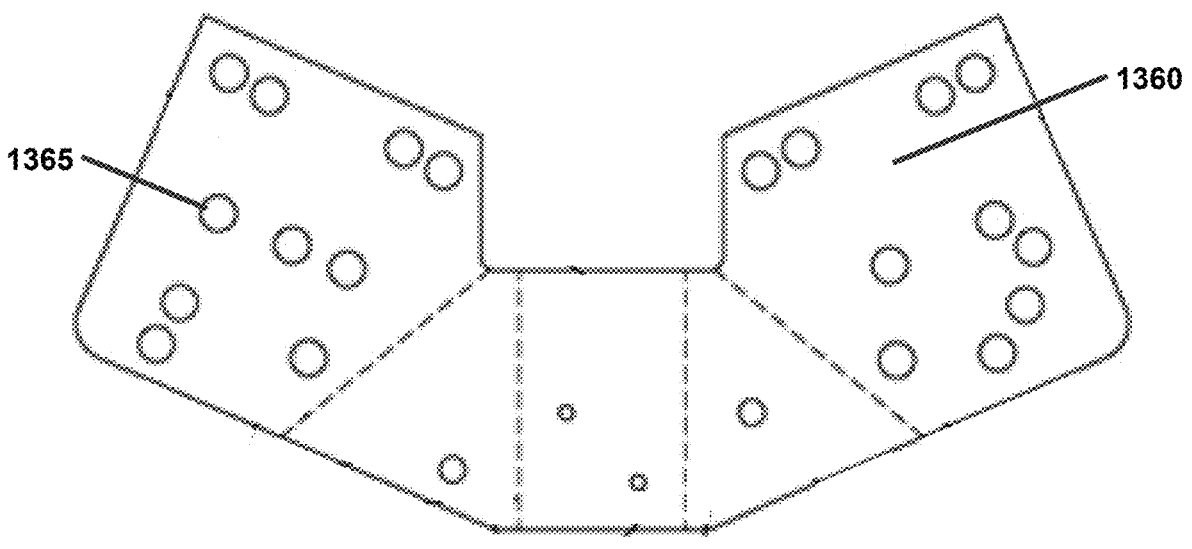

FIGS. 13A and 13B illustrate various configurations of a first example uninstalled construction connector 1360 in the prior art on which disclosed embodiments may be practiced. FIGS. 13A and 13B illustrate various configurations of an example hanger bracket by MiTek® Construction connector 1360 may be considered a third construction connector type. In FIG. 13A, construction connector 1360 is formed for installation. In FIG. 13B, construction connector 1360 is pre-formed. Construction connector 1360 may be formed into a multiplane construction connector as shown in FIG. 13A. Construction connector 1360 is configured for installation through employment of a plurality of fastener receptacles 1365.

Figure 14:
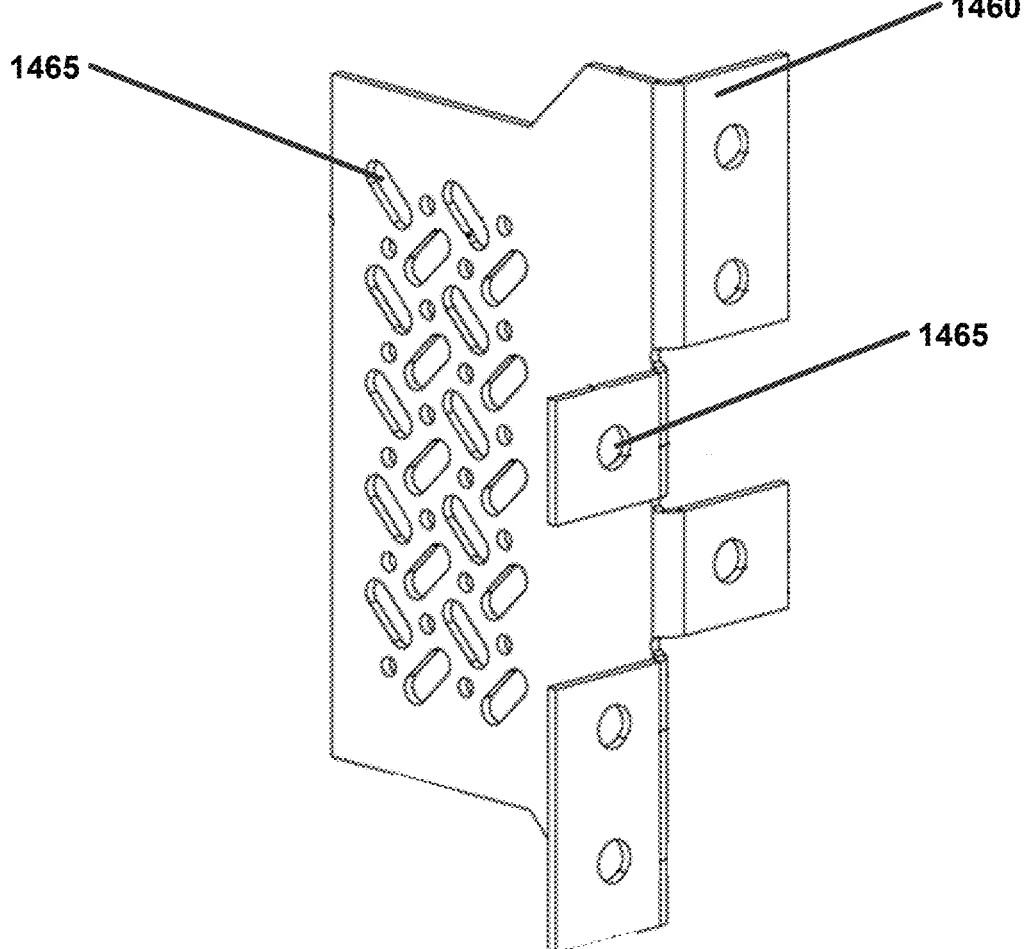
FIG. 14 illustrates a second example uninstalled construction connector in the prior art on which disclosed embodiments may be practiced.

FIG. 14 illustrates a second example uninstalled construction connector 1460 in the prior art on which disclosed embodiments may be practiced. FIG. 14 illustrates an example concealed structural connector by MiTek®. Construction connector 1460 may be considered a fourth construction connector type. Construction connector 1460 comprises a multiplane construction connector. Construction connector 1460 is configured for installation through employment of a plurality of fastener receptacles 1465.

Figure 15:
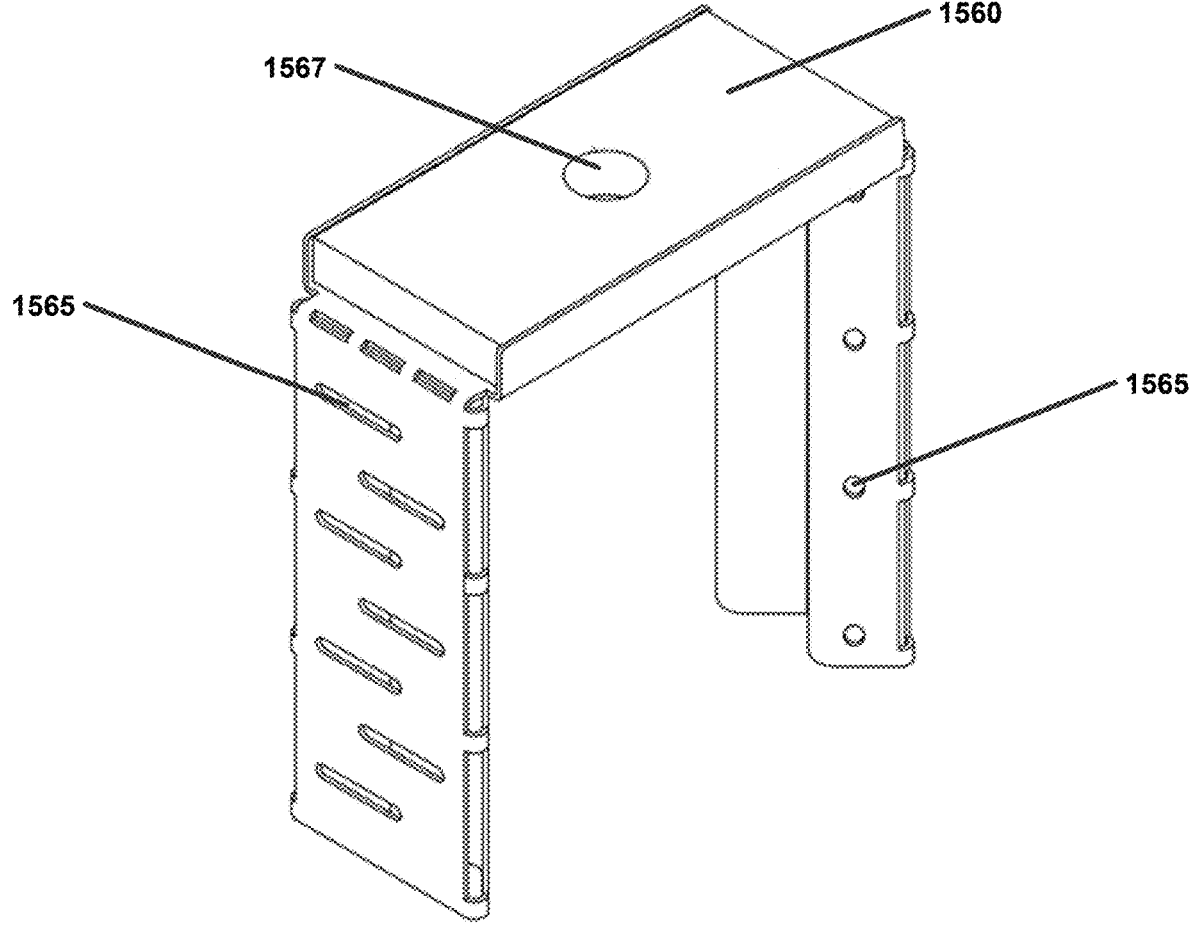
FIG. 15 illustrates a third example uninstalled construction connector in the prior art on which disclosed embodiments may be practiced.

FIG. 15 illustrates a third example uninstalled construction connector 1560 in the prior art on which disclosed embodiments may be practiced. FIG. 15 illustrates an example holdown by MiTek®. Construction connector 1560 may be considered a fifth construction connector type. Construction connector 1560 comprises a multiplane construction connector. Construction connector 1560 is configured for installation through employment of a plurality of fastener receptacles (1565, 1567). Fastener receptacles 1565 may be configured for at least one first fastener type. Fastener receptacle 1567 may be configured for at least one second fastener type.

Figure 16A:
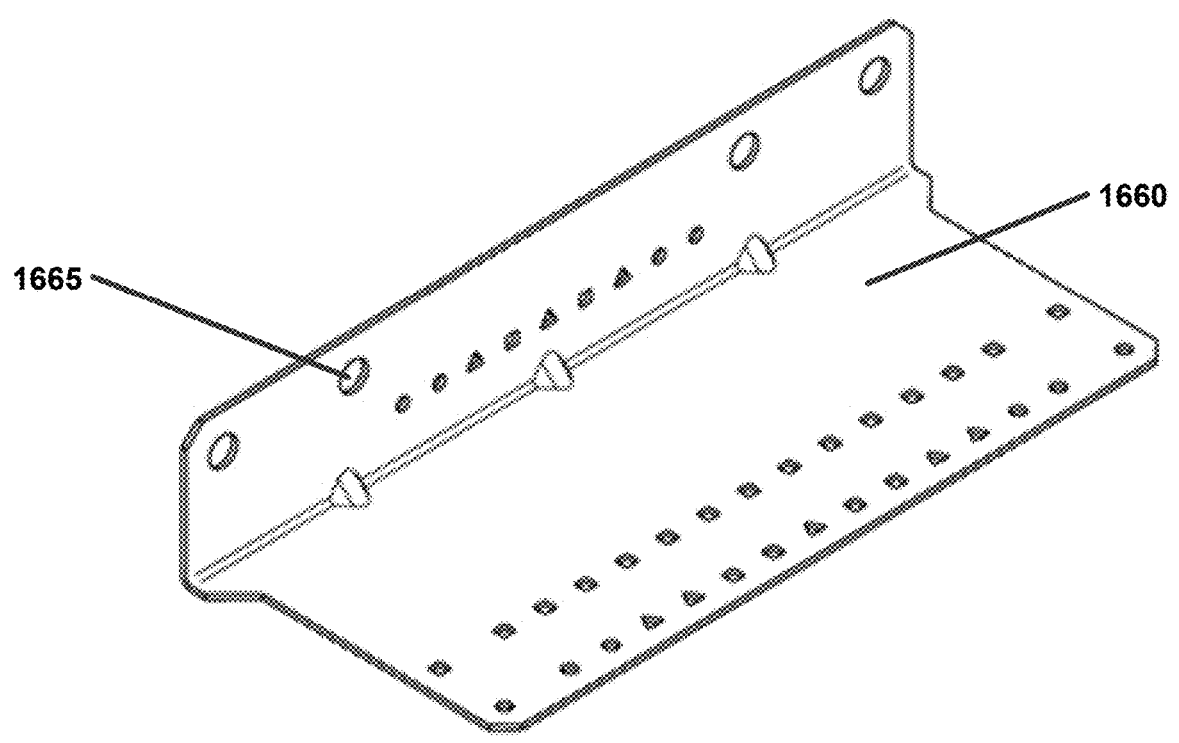
FIGS. 16A and 16B illustrate fourth and fifth example uninstalled construction connectors in the prior art on which disclosed embodiments may be practiced.
Figure 16B:
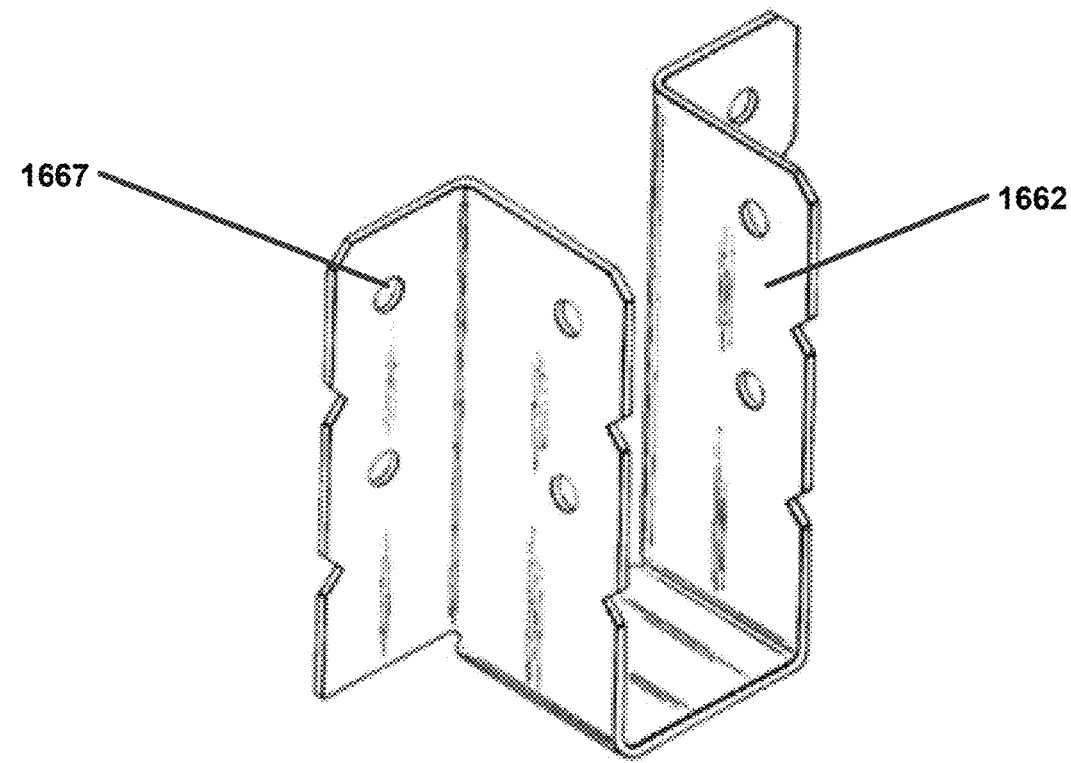

FIGS. 16A and 16B illustrate fourth and fifth example uninstalled construction connectors (1660, 1662) in the prior art on which disclosed embodiments may be practiced. FIG. 16A illustrates an example steel-joist connector by Simpson Strong-Tie®. A steel-joist connector by Simpson Strong-Tie® may be considered a sixth construction connector type. Construction connector 1660 comprises a multiplane construction connector. Construction connector 1660 is configured for installation through employment of a plurality of fastener receptacles 1665. FIG. 16B illustrates an example ornamental joist hanger by Simpson Strong-Tie®. An ornamental joist hanger by Simpson Strong-Tie® may be considered a seventh construction connector type. Construction connector 1662 comprises a multiplane construction connector. Construction connector 1662 is configured for installation through employment of a plurality of fastener receptacles 1667.

Figure 17A:
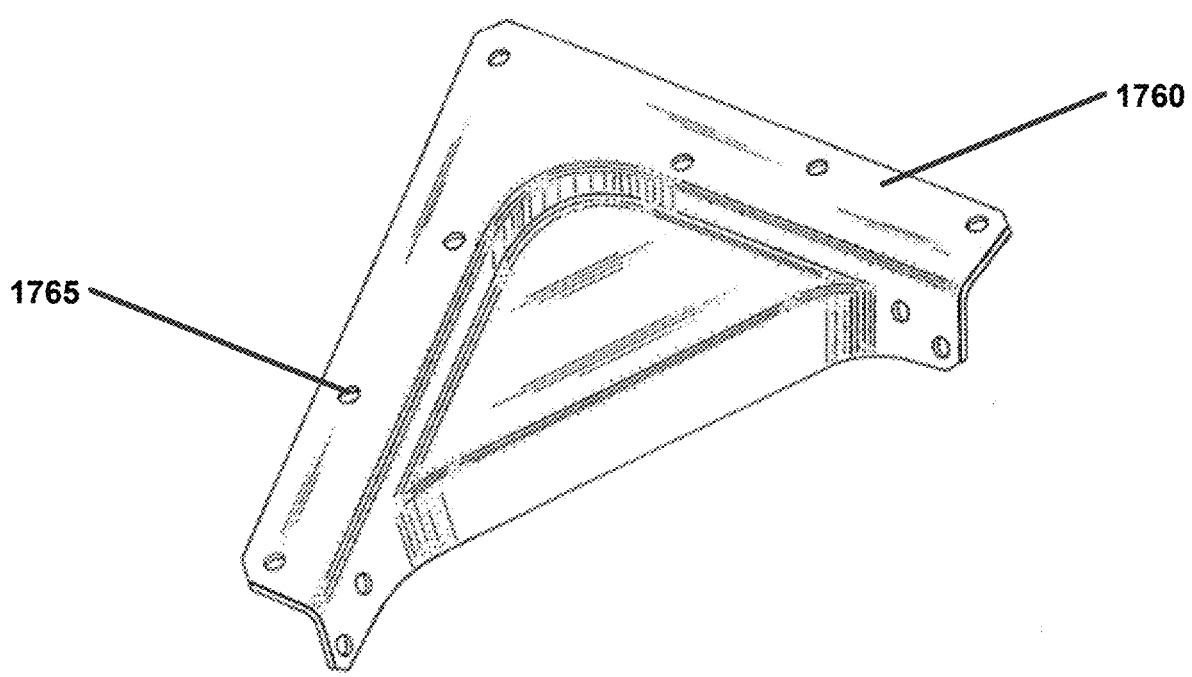
FIGS. 17A and 17B illustrate sixth and seventh example uninstalled construction connectors in the prior art on which disclosed embodiments may be practiced.
Figure 17B:
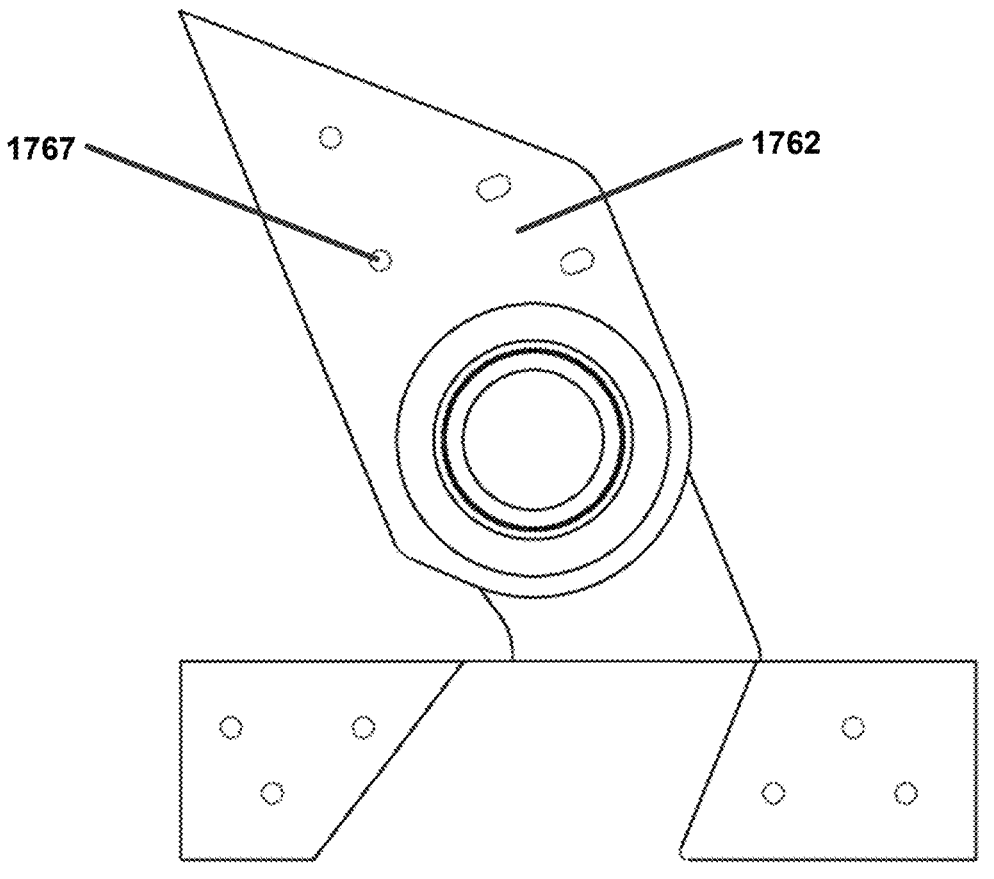

FIGS. 17A and 17B illustrate sixth and seventh example uninstalled construction connectors (1760, 1762) in the prior art on which disclosed embodiments may be practiced. FIG. 17A illustrates an example structural connector by Simpson Strong-Tie®. Construction connector 1760 may be considered an eighth construction connector type. Construction connector 1760 comprises a multiplane construction connector. Construction connector 1760 is configured for installation through employment of a plurality of fastener receptacles 1765. FIG. 17B illustrates an example heel hinge connector by Simpson Strong-Tie®. Construction connector 1762 may be considered a ninth construction connector type. Construction connector 1762 is configured for installation through employment of a plurality of fastener receptacles 1767.

Figure 18:
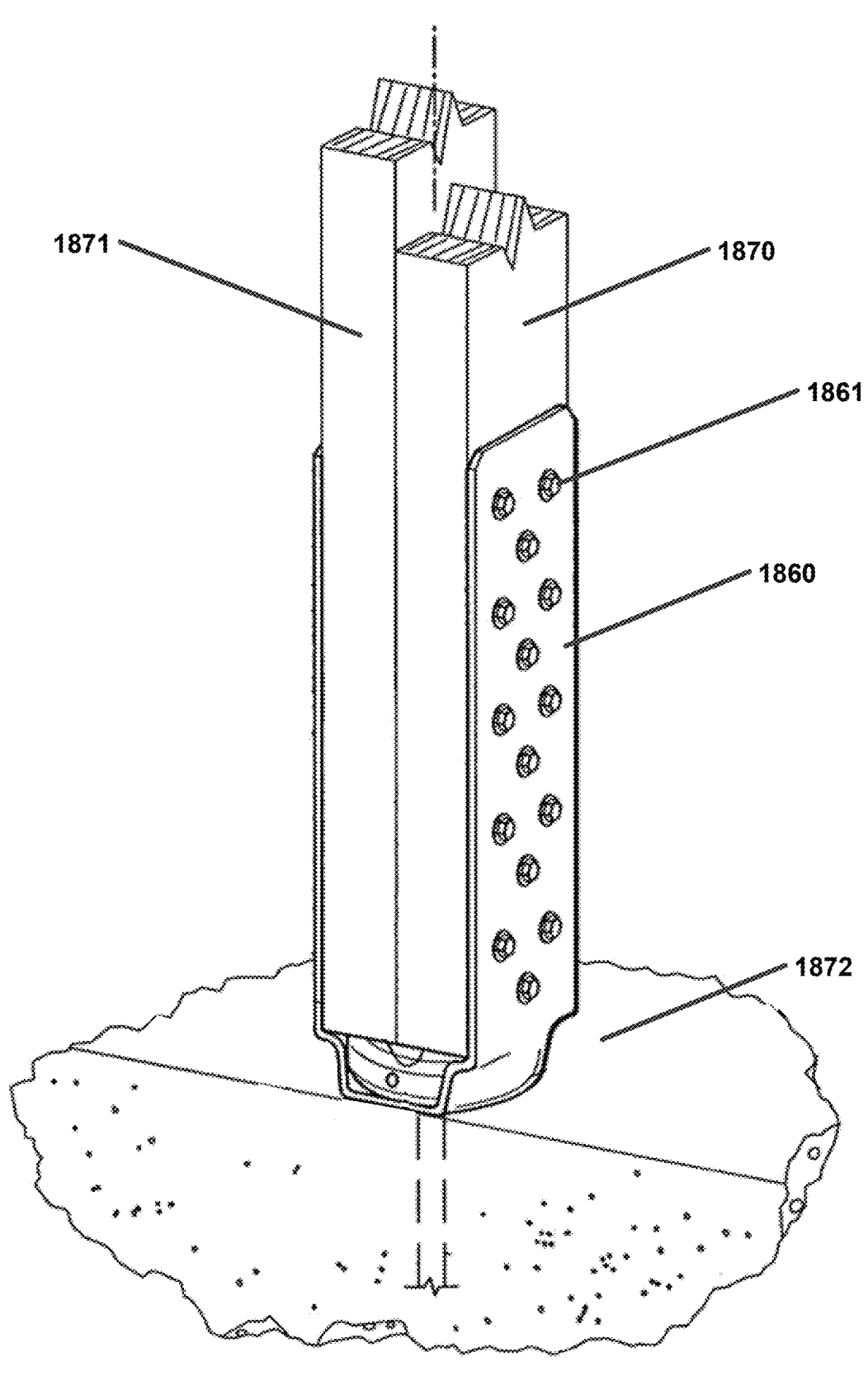
FIG. 18 illustrates a third example installed construction connector in the prior art on which disclosed embodiments may be practiced.

FIG. 18 illustrates a third example installed construction connector (1860) in the prior art on which disclosed embodiments may be practiced. FIG. 18 illustrates an example installed concentric holdown by Simpson Strong-Tie®. A concentric holdown by Simpson Strong-Tie® may be considered a tenth construction connector type. Construction connector 1860 comprises a multiplane construction connector. Construction connector 1860 may be installed to a first substrate 1870 and a second substrate 1871. Construction connector 1860 may be installed to the substrates through employment of a plurality of fasteners 1861. Construction connector 1860 may be installed to a third substrate 1872.

Figure 19:
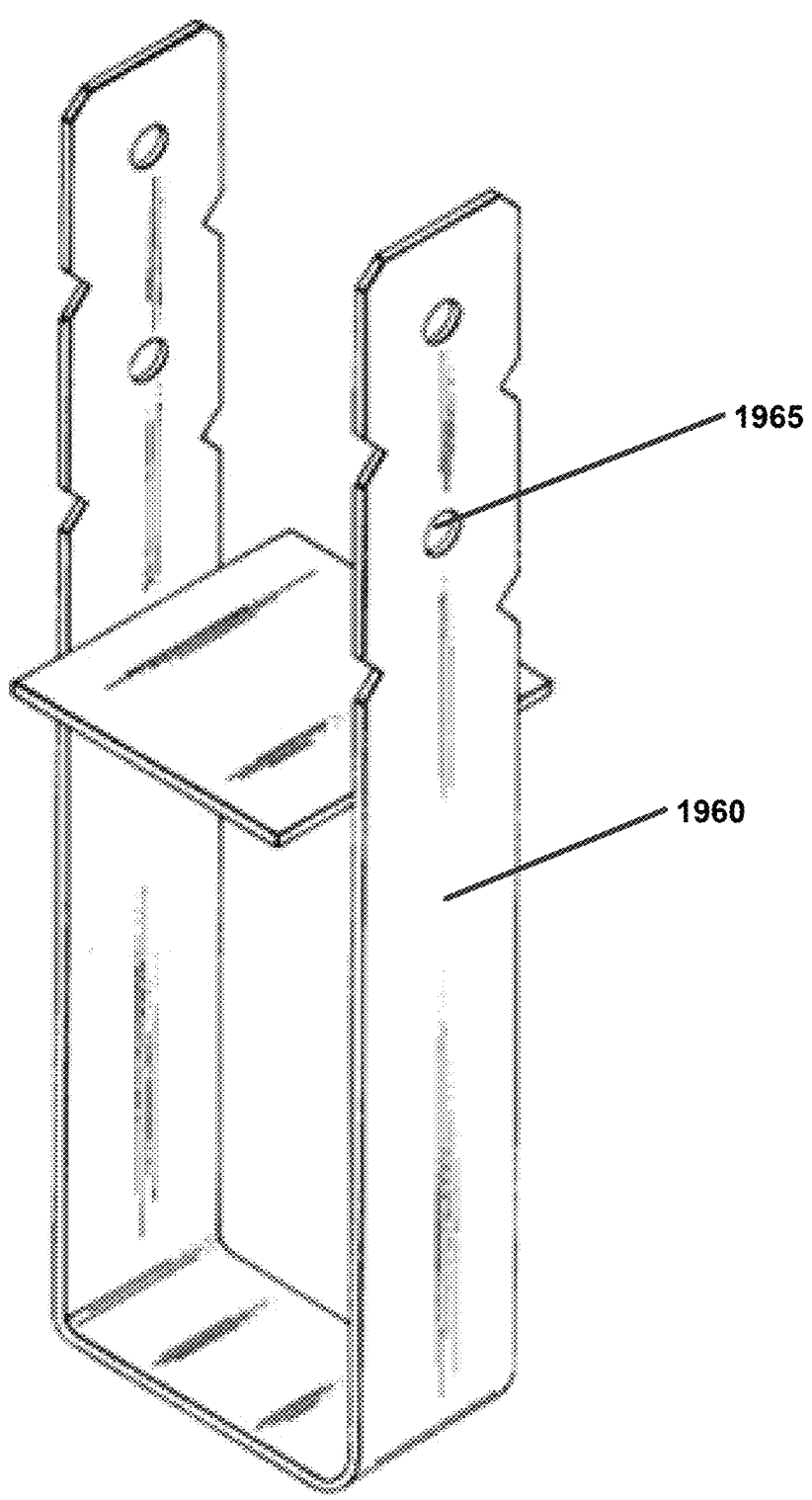
FIG. 19 illustrates an eighth example uninstalled construction connector in the prior art on which disclosed embodiments may be practiced.

FIG. 19 illustrates an eighth example uninstalled construction connector 1960 in the prior art on which disclosed embodiments may be practiced. FIG. 19 illustrates an example ornamental column base by Simpson Strong-Tie®. An ornamental column base by Simpson Strong-Tie® may be considered an eleventh construction connector type. Construction connector 1960 comprises a multiplane construction connector. Construction connector 1960 is configured for installation through employment of a plurality of fastener receptacles 1965.

Figure 20:
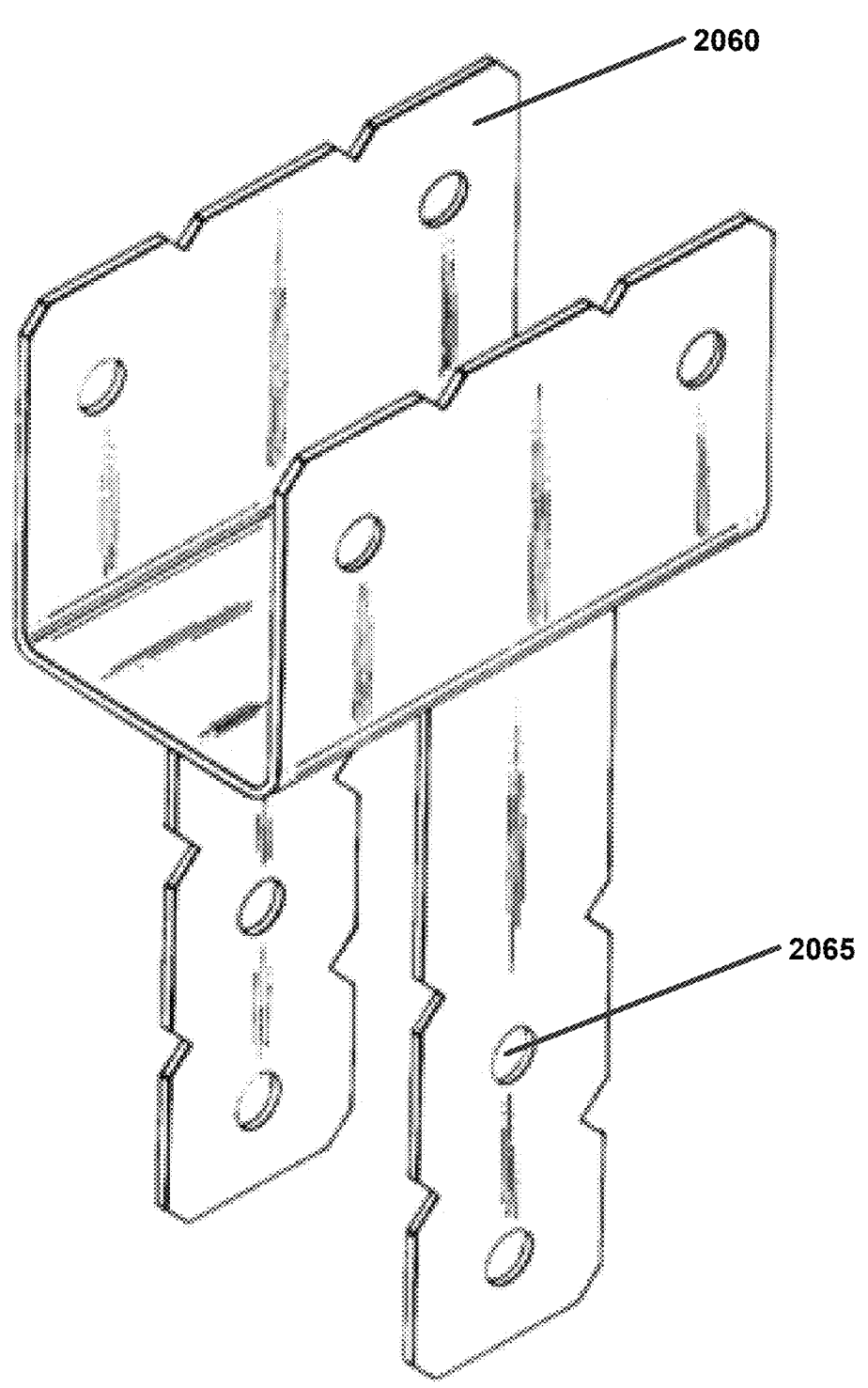
FIG. 20 illustrates a ninth example uninstalled construction connector in the prior art on which disclosed embodiments may be practiced.

FIG. 20 illustrates a ninth example uninstalled construction connector 2060 in the prior art on which disclosed embodiments may be practiced. FIG. 20 illustrates an example ornamental column cap by Simpson Strong-Tie®. An ornamental column cap by Simpson Strong-Tie® may be considered a twelfth construction connector type. Construction connector 2060 comprises a multiplane construction connector. Construction connector 2060 is configured for installation through employment of a plurality of fastener receptacles 2065.

Figure 21:
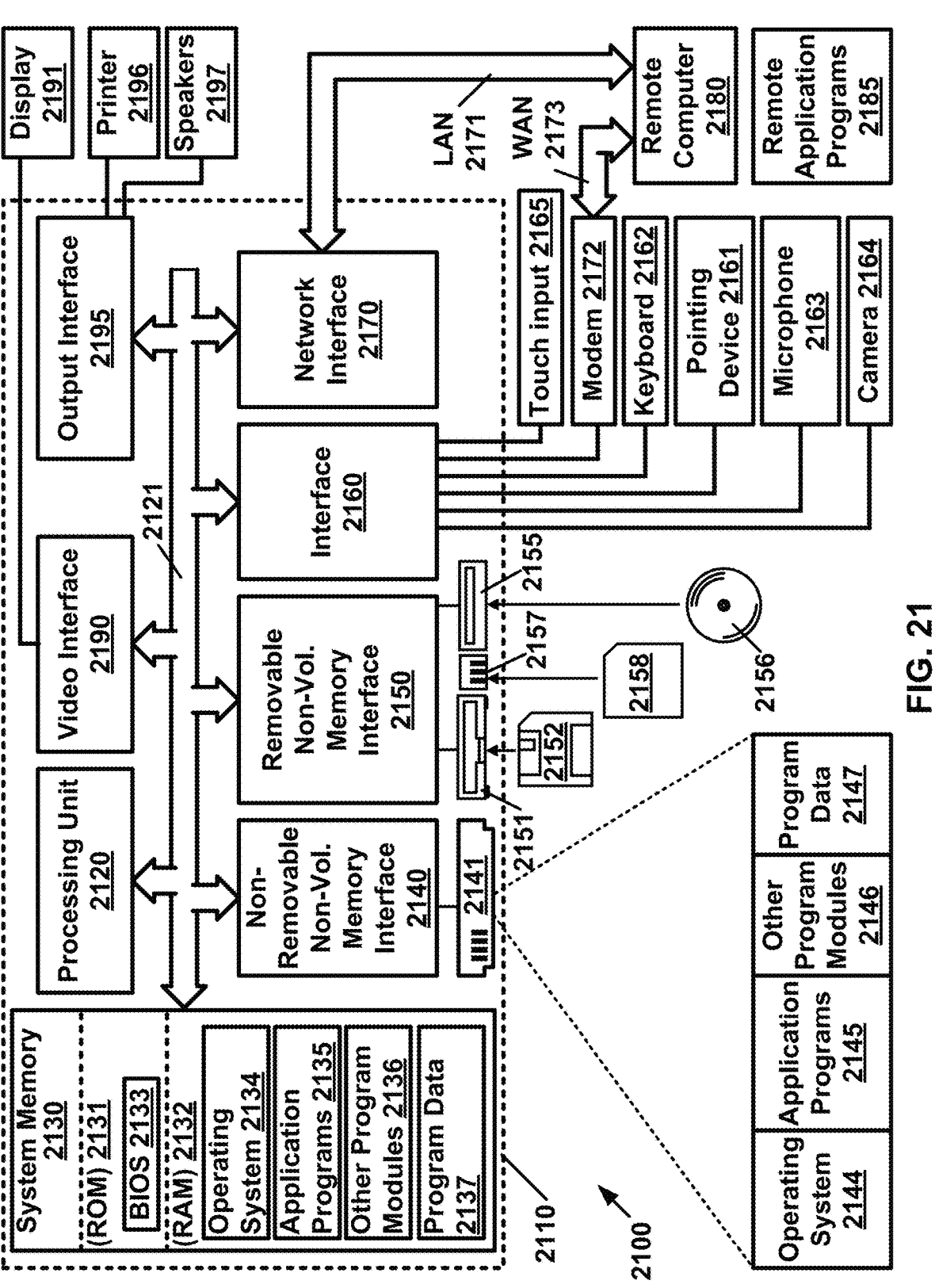
FIG. 21 is a block diagram of an example computing environment in which disclosed embodiments may be practiced.

FIG. 21 is a block diagram of an example computing environment 2100 in which disclosed embodiments may be practiced. Computing environment 2100 may comprise computing device 2110. Components of computing device 2110 may include, but are not limited to, processing unit 2120, system memory 2130, and system bus 2121 that couples various system components including system memory 2130 to processing unit 2120.

Computing device 2110 may comprise a variety of computer readable media. Computer readable media may be available media accessible by computing device 2110 and may include both volatile and nonvolatile media, removable and non-removable media. By way of example, and not limitation, computer readable media may comprise computer storage media and communication media. Computer storage media may comprise both volatile and nonvolatile, removable and non-removable media implemented in a method or technology for storage of data such as computer readable instructions, data structures, program modules, other data, combinations thereof, and/or any other type of data. Computer storage media may comprise, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, and/or any other medium which may be employed to store data and which may be accessed by computer 2110. Communication media may comprise computer readable instructions, data structures, program modules and/or other data in a modulated data signal such as a carrier wave and/or other transport mechanism and may comprise data delivery media. The term "modulated data signal" means a signal that has one or more of its characteristics set or changed in such a manner as to encode data in the signal. By way of example, and not limitation, communication media includes wired media such as a wired network or direct-wired connection, and wireless media such as acoustic, radio frequency (RF), infrared and other wireless media. Combinations of any of the above may also be included within the scope of computer readable media.

System memory 2130 may comprise computer storage media in the form of volatile and/or nonvolatile memory such as ROM 2131 and RAM 2132. Basic input/output system 2133 (BIOS), containing the basic routines that help to transfer data between elements within computer 2110, such as during start-up, may be stored in ROM 2131. RAM 2132 may comprise data and/or program modules that may be accessible to and/or presently being operated on by processing unit 2120. By way of example, and not limitation, FIG. 21 illustrates operating system 2134, application programs 2135, other program modules 2136, and program data 2137.

Computing device 2110 may also comprise other removable/non-removable volatile/nonvolatile computer storage media. By way of example only, FIG. 21 illustrates hard disk drive 2141 that may read from or write to non-removable, nonvolatile magnetic media, magnetic disk drive 2151 that may read from or write to a removable, nonvolatile magnetic disk 2152, flash drive reader 2157 that may read flash drive 2158, and optical disk drive 2155 that may read from or write to a removable, nonvolatile optical disk 2156 such as a CD ROM or other optical media. Other removable/non-removable, volatile/nonvolatile computer storage media that may be used in the operating environment include, but are not limited to, magnetic tape cassettes, flash memory cards, digital versatile disks, digital video tape, solid state RAM, solid state ROM, and the like. Hard disk drive 2141 may be connected to system bus 2121 through a non-removable memory interface such as interface 2140, and magnetic disk drive 2151 and optical disk drive 2155 may be connected to system bus 2121 by a removable memory interface, such as interface 2150.

The drives and their associated computer storage media discussed above and illustrated in FIG. 21 provide storage of computer readable instructions, data structures, program modules and other data for computer 2110. In FIG. 21, for example, hard disk drive 2141 is illustrated as storing operating system 2144, application programs 2145, program data 2147, and other program modules 2146. Additionally, for example, non-volatile memory may include instructions for presenting images on a display 2191 of computing device 2100 and/or the like. Similarly, non-volatile memory may comprise instructions for causing the presentation of images on the display of remote computing device 2180 and/or the like. Display 2191 and touch input 2165 may be integrated into the same device.

A user may enter commands and data into computing device 2110 through input devices such as touch input device 2165, keyboard 2162, microphone 2163, camera 2164, and pointing device 2161, such as a mouse, trackball, or touch pad. These and other input devices may be connected to processing unit 2120 through interface 2160 coupled to system bus 2121, but may be connected by other interface and bus structures, such as a parallel port, game port, or a universal serial bus (USB). A display 2191 or other type of display device may be connected to system bus 2121 via an interface, such as video interface 2190. Other devices, such as, for example, speakers 2197 and printer 2196 may be connected to computing device 2110 via output interface 2195.

Computing device 2110 may be operated in a networked environment using logical connections to one or more remote computers, such as remote computer 2180. Remote computer 2180 may be a personal computer, a hand-held device, a server, a router, a network PC, a peer device, or other common network node, and typically includes many or all of the elements described above relative to computing device 2110. The logical connections depicted in FIG. 21 include local area network (LAN) 2171 and wide area network (WAN) 2173, but may also include other networks. Such networking environments are commonplace in offices, enterprise-wide computer networks, intranets, and the Internet.

When used in a LAN networking environment, computing device 2110 is connected to LAN 2171 through network interface/adapter 2170. When used in a WAN networking environment, computing device 2110 may comprise modem 2172 or other means for establishing communications over WAN 2173, such as the Internet. Modem 2172, which may be internal or external, may be connected to system bus 2121 via interface 2160, or another appropriate mechanism. Modem 2172 may be wired or wireless. Examples of wireless devices may comprise, but are not limited to: Wi-Fi and Bluetooth. In a networked environment, program modules depicted relative to computing device 2110, or portions thereof, may be stored in a remote memory storage device. By way of example, and not limitation, FIG. 21 illustrates remote application programs 2185 as residing on remote computer 2180. It will be appreciated that the network connections shown are presented as examples only and other means of establishing a communications link between computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". In this specification, the term "may" is to be interpreted as "may, for example." In other words, the term "may" is indicative that the phrase following the term "may"

is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

Many of the elements described in the disclosed embodiments maybe implemented as operations. An operation is defined here as an isolatable element that performs a defined function and has a defined interface to other elements. The operations described in this disclosure may be implemented in hardware, a combination of hardware and software, firmware, wetware (in other words, hardware with a biological element), or a combination thereof, all of which are behaviorally equivalent. For example, operations may be implemented using computer hardware in combination with software routine(s) written in a computer language (for example, Java, HTML, XML, PHP, Python, ActionScript, JavaScript, Ruby, Prolog, SQL, VBScript, Visual Basic, Perl, C, C++, Objective-C, Rust, and/or any other computer language). Additionally, it may be possible to implement operations using physical hardware that incorporates discrete or programmable analog, digital, and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers, and microprocessors may be programmed using languages such as assembly, C, C++, and/or any other language. FPGAs, ASICs, and CPLDs are often programmed using hardware description languages (HDL) such as VHSIC hardware description language (VHDL) or Verilog that configure connections between internal hardware operations with lesser functionality on a programmable device. Finally, it needs to be emphasized that the above-mentioned technologies may be used in combination to achieve the result of a functional operation. Automatic operations are performed automatically and do not require human intervention to complete once executed. Automatic as defined herein does not include any time limitations unless otherwise noted.

Some embodiments may employ processing hardware. Processing hardware may include one or more processors, computer equipment, embedded system, machines, and/or any other type of processing hardware. The processing hardware may be configured to execute instructions. The instructions may be stored on a machine-readable medium. According to some embodiments, the machine-readable medium (e.g., at least one memory) may be a medium configured to store data in a machine-readable format that may be accessed by an automated sensing device. Examples of machine-readable media include: flash memory, memory cards, electrically erasable programmable read-only memory (EEPROM), solid state drives, optical disks, barcodes, magnetic ink characters, and/or any other type of machine-readable medium.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. In particular, it should be noted that, for example purposes, a UGV system has been described as including a server and a UGV. However, one skilled in the art will recognize that the server and UGV may vary from a traditional server/device relationship over a network such as the internet. For example, a server may be collective based: portable equipment, broadcast equipment, virtual, application(s) distributed over a broad combination of computing sources, part of a cloud, and/or the like. Similarly, for example, a UGV may comprise a user based client, portable equipment, broadcast equipment, virtual, application(s) distributed over a broad combination of computing sources, part of a cloud, and/or the like. Additionally, it should be noted that, for example purposes, several of the various embodiments comprise operations. However, one skilled in the art will recognize that many various languages and frameworks may be employed to build and use embodiments of the present invention.

In this specification, various embodiments are disclosed. Limitations, features, and/or elements from the disclosed example embodiments may be combined to create further embodiments within the scope of the disclosure. Moreover, the scope includes any and all embodiments having equivalent elements, modifications, omissions, adaptations, or alterations based on the present disclosure. Further, aspects of the disclosed methods can be modified in any manner, including by reordering aspects, or inserting or deleting aspects.

In addition, it should be understood that any figures that highlight any functionality and/or advantages, are presented for example purposes only. The disclosed architecture is sufficiently flexible and configurable, such that it may be utilized in ways other than that shown. For example, the blocks presented in any flowchart may be re-ordered or only optionally used in some embodiments.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features, or with all three of the three possible features.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. An Unmanned Ground Vehicle (UGV) comprising:
   a) a guidance system;
   b) a propulsion system;
   c) an imaging system;
   d) at least one memory storing instructions; and e) at least one processor being configured to execute the instructions to perform operations, the operations comprising:

i) automatically navigating the UGV to an imaging location through employment of the guidance system, the propulsion system, and the imaging system;

ii) automatically capturing image data, the image data indicating a construction connector;

iii) automatically classifying the image data through employment of a classifier, the classifier based on construction connector training data, the construction connector training data relating to a plurality of construction connectors; and iv) automatically determining an installation state of the construction connector based on the classification.

2. The UGV according to claim 1, wherein the installation state indicates an improper installation, and the operations further comprise automatically tagging the imaging location.

3. The UGV according to claim 1, wherein the installation state indicates one or more missing fasteners associated with the construction connector.

4. The UGV according to claim 3, further comprising:

a) a fastener carrier configured to carry a plurality of fasteners; and b) an effector configured to position and install the fasteners through the construction connector to a substrate behind the construction connector.

5. The UGV according to claim 4, wherein the effector is configured to install the fasteners through the construction connector to the substrate behind the construction connector at angles other than 90 degrees to a surface of the construction connector.

6. The UGV according to claim 4, wherein the operations further comprise automatically installing the one or more missing fasteners through employment of the imaging system and the effector.

7. The UGV according to claim 4, wherein the effector comprises one of the following:

a) a nail gun; or b) an electric hammer.

8. The UGV according to claim 7, wherein the effector further comprises a pressure sensor configured to measure a pressure applied to the fasteners during installation.

9. The UGV according to claim 8, wherein the operations further comprise automatically verifying adequate installation of the fasteners based on the imaging system and the pressure sensor.

10. The UGV according to claim 4, wherein the effector comprises at least one of the following:

a) a screw gun;

b) an impact driver;

c) a ratchet; or d) an impact wrench.

11. The UGV according to claim 10, wherein the effector further comprises a torque sensor configured to measure a torque applied to the fasteners during installation.

12. The UGV according to claim 11, wherein the operations further comprise automatically verifying adequate installation of the fasteners based on the imaging system and the torque sensor.

13. The UGV according to claim 4, wherein the substrate comprises at least one of the following:

a) dimensional lumber;

b) engineered wood;

c) composite wood;

d) laminated wood;

e) sheet metal;

f) metal deck;

g) structural steel;

h) concrete;

i) masonry;

j) foam; or k) insulated metal panels (IMP).

14. The UGV according to claim 1, wherein the operations further comprise automatically storing the image data.

15. The UGV according to claim 1, wherein the installation state indicates one or more inadequately installed fasteners associated with the construction connector.

16. The UGV according to claim 15, wherein the one or more inadequately installed fasteners indicates at least one of the following:

a) an inadequate fastener size;

b) an inadequate fastener type; or c) inadequate penetration into a substrate.

17. The UGV according to claim 15, further comprising:

a) a fastener carrier configured to carry a plurality of fasteners; and b) an effector configured to remove inadequately installed fasteners.

18. The UGV according to claim 17, wherein the operations further comprise automatically removing the one or more inadequately installed fasteners through employment of the imaging system and the effector.

19. The UGV according to claim 17, wherein the effector comprises a fastener remover.

20. The UGV according to claim 1, further comprising a Ground Penetrating Radar (GPR) sensor, the GPR sensor employed in the determining of the installation state.

\*   \*   \*   \*   \*